United States Patent
Mogamiya

(10) Patent No.: US 6,374,060 B1
(45) Date of Patent: Apr. 16, 2002

(54) HYBRID CAMERA SELECTIVELY USING PHOTOGRAPHIC FILM AND IMAGE SENSOR

(75) Inventor: Makoto Mogamiya, Tokyo (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/557,909

(22) Filed: Apr. 21, 2000

(30) Foreign Application Priority Data

| Apr. 22, 1999 | (JP) | 11-114800 |
| Apr. 22, 1999 | (JP) | 11-114857 |
| Apr. 26, 1999 | (JP) | 11-117811 |
| Apr. 26, 1999 | (JP) | 11-117818 |

(51) Int. Cl.[7] ............................................. G03B 17/00
(52) U.S. Cl. ........................ 396/429; 396/440; 348/64
(58) Field of Search ................. 396/429, 415, 396/440, 446, 435, 442, 387, 411, 414; 348/64

(56) References Cited

U.S. PATENT DOCUMENTS

| 4,034,388 A | * | 7/1977 | Iwashita et al. | 396/418 |
| 5,179,478 A |   | 1/1993 | Aoki |  |
| 5,477,293 A | * | 12/1995 | Osakabe | 396/435 |
| 5,752,116 A | * | 5/1998 | Lai | 396/435 |
| 5,870,638 A |   | 2/1999 | Kurosawa |  |
| 5,933,670 A | * | 8/1999 | Cama et al. | 396/429 |
| 5,940,642 A | * | 8/1999 | Ishiguro | 396/378 |
| 6,027,259 A | * | 2/2000 | Yazawa | 396/442 |
| 6,035,147 A | * | 3/2000 | Kurosawa | 396/429 |
| 6,134,393 A | * | 10/2000 | Melman | 396/429 |
| 6,181,881 B1 | * | 1/2001 | Konishi et al. | 396/378 |

* cited by examiner

*Primary Examiner*—David M. Gray
(74) *Attorney, Agent, or Firm*—Greenblum & Bernstein, P.L.C.

(57) ABSTRACT

A hybrid camera of the present invention selectively uses one of a photographic film and an image sensor, to record an object image. The hybrid camera has a photographing optical system, a body, and a film positioner. The film positioner is detachably mounted in the body and defines a position of an exposure area of the photographic film, along an optical axis of the photographing optical system. An accommodation space, which can accommodate the image sensor, is formed in the body by detaching the film positioner. When using the photographic film, the film positioner is mounted in the body such that the position of the exposure area coincides with a position of a focal plane, defined by the photographing optical system. Then, when using the image sensor, the film positioner is detached from the body and the image sensor is placed in the accommodation space, such that a position of a light-receiving area of the image sensor coincides with the position of the focal plane, along the optical axis.

32 Claims, 26 Drawing Sheets

FILM

IMAGE SENSOR

FIG. 10
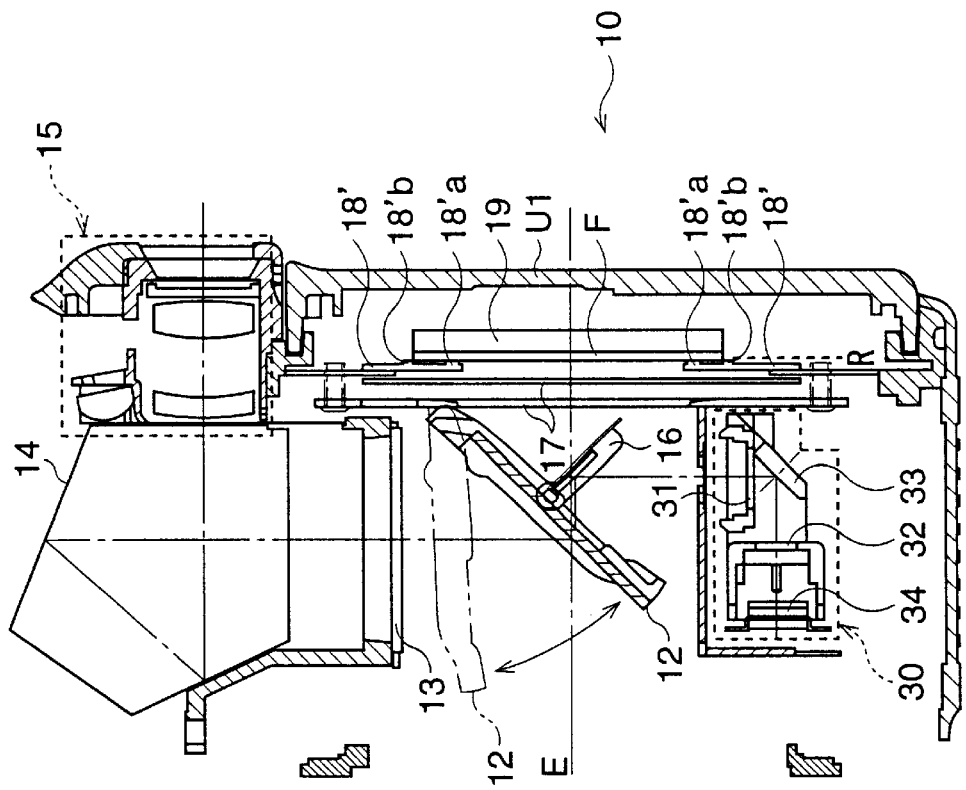
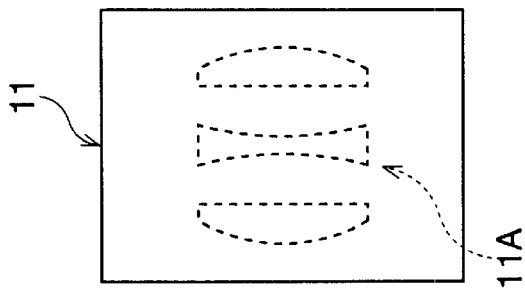
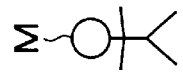

FIG. 20
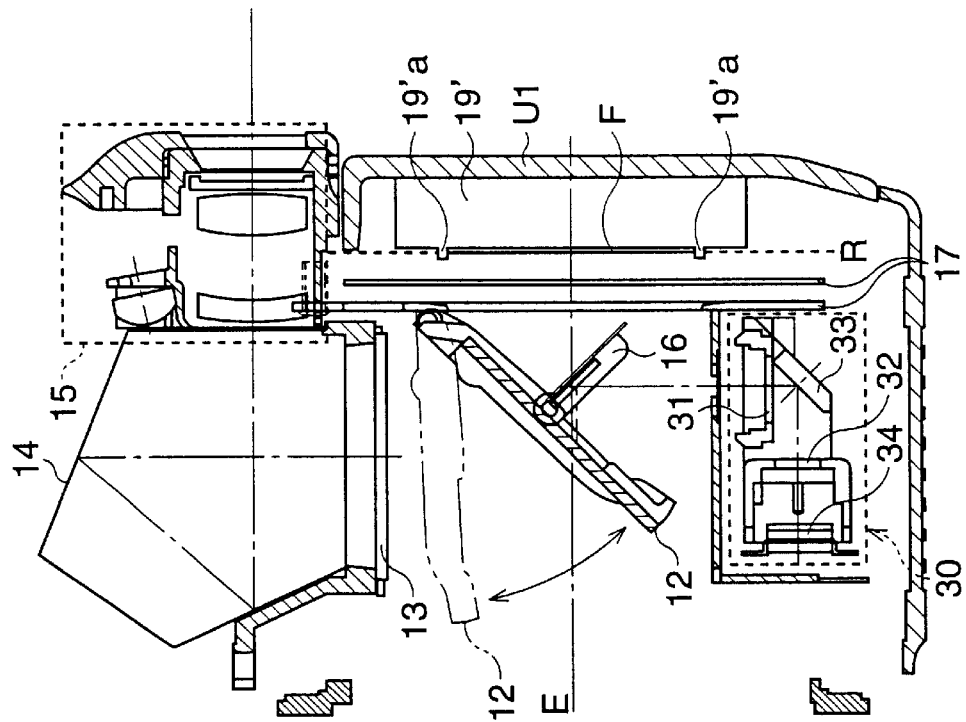
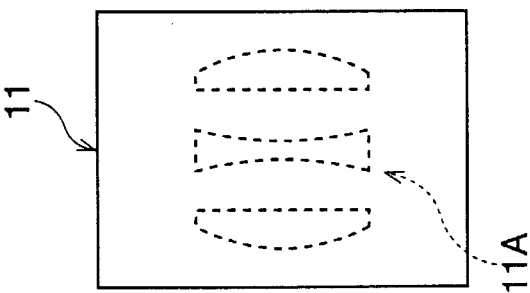
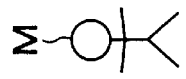

FIG. 27A
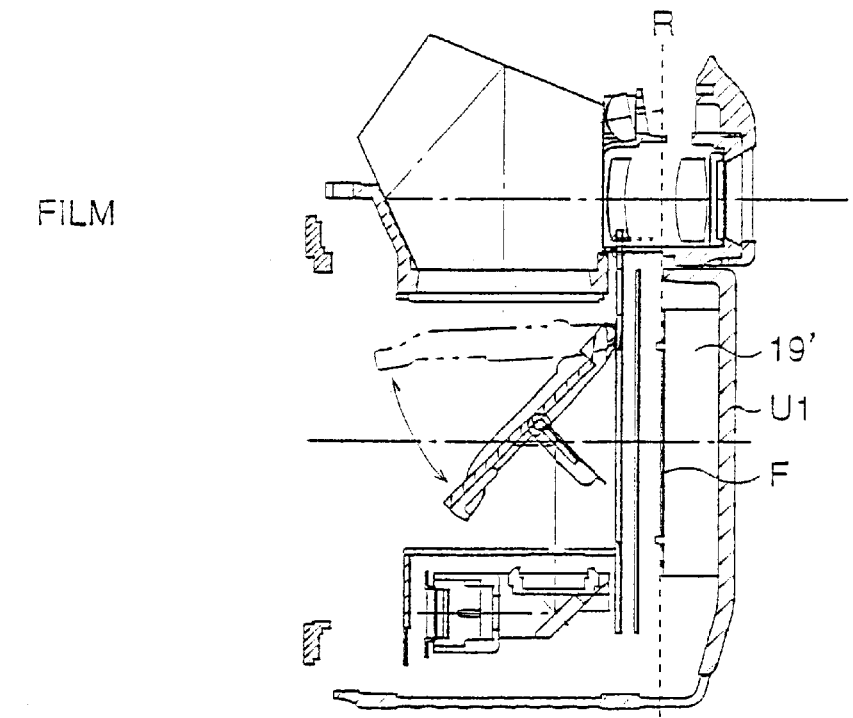
FILM
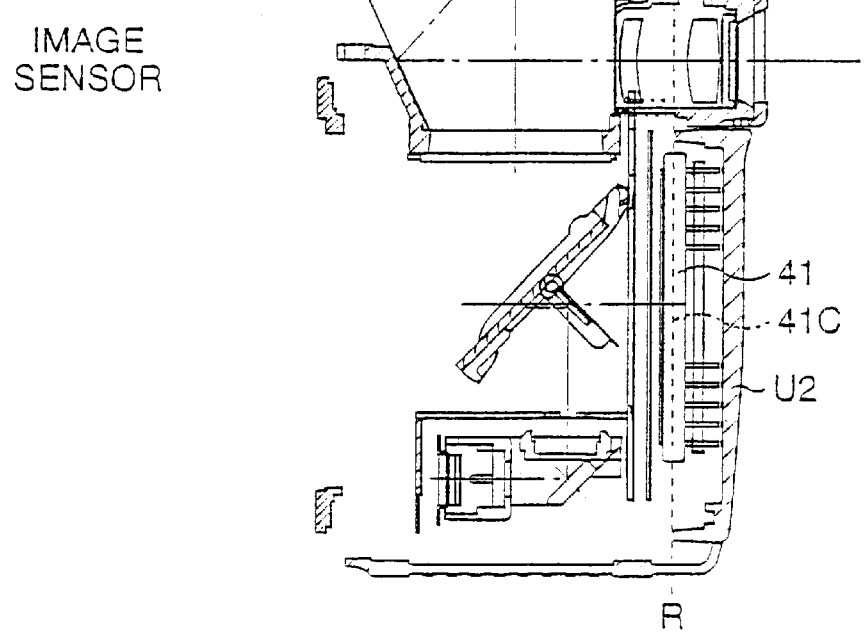
IMAGE SENSOR
FIG. 27B

HYBRID CAMERA SELECTIVELY USING PHOTOGRAPHIC FILM AND IMAGE SENSOR

BACKGROUND OF THE INVENTION

1. Field of the invention

This invention relates to a hybrid camera, which can record an object image on a photographic film and further can record the object image in a memory as digital image data, by using an image sensor. Especially, this invention relates to a hybrid camera selectively using one of the photographic film and the image sensor when recording the object image.

2. Description of the Related Art

Recently, a hybrid camera having a photographing optical system, which can record an object image on a silver-halide type photographic film and further record the object image in the memory medium, such as an IC memory card, is known. In the case of the hybrid camera, two back-covers are prepared in advance, and selectively used as required. One of the two back-covers has a pressure plate to press the photographic film toward a plate-like member having an aperture, which is provided in a camera body. The other back-cover has an image sensor, such as a CCD, the image sensor being attached inside of the back-cover.

When the back-cover for the film is attached the rear side of the camera body and closed (locked), the photographic film is positioned, such that a position of an exposure area of the film, on which the object image is formed, coincides with a position of a focal plane, defined by the photographing optical system. Light, admitted through the photographing optical system, passes through the aperture, where by the object image is formed on the exposure area of the film. At this time, the focused object image is obtained.

On the other hand, when using the image sensor, the back-cover having the image sensor is attached to the camera body in place of the back-cover for the film and closed, whereby the object image is formed on a light-receiving area of the image sensor, on which photoelectric devices are arranged.

Incidentally, when recording the object image in the memory, a large-sized image sensor is needed to obtain a high-quality image, equal to the object image obtained by the film, especially to that of a SLR type hybrid camera having a focal plane shutter, which is a respectively high-quality camera. Further, in order to obtain the object image, perfectly identical to the object image recorded on the film, with respect to image plane frame, a size of the light-receiving area should be identical to that of the exposure area corresponding to one frame of the film. Therefore, a size of the image sensor becomes larger than that of the exposure area, namely, the aperture area, to obtain the high-quality image.

However, generally, the image sensor is covered with a transparent cover glass, for protecting the light-receiving area. Namely, the light-receiving area is disposed under the cover glass. As the aperture can not accommodate the large-sized image sensor, the position of the light-receiving area does not coincide with the position of the focal plane. Consequently, the focused object image can not be obtained when using the large-sized image sensor.

SUMMARY OF THE INVENTION

Therefore, an object of a present invention is to provide a hybrid camera, which can easily align both the position of the light-receiving area of the image sensor and the position of the exposure area of the film with the position of the focal plane.

A hybrid camera of the present invention selectively uses one of a photographic film and an image sensor, to record an object image. The hybrid camera has a photographing optical system, a body, and a film positioner. The photographing optical system forms the object image, and the photographing optical system is connected to the body. The film positioner is detachably mounted in the body and defines a position of an exposure area of the photographic film, along an optical axis of the photographing optical system. An accommodation space, which can accommodate the image sensor, is formed in the body by detaching the film positioner. When using the photographic film, the film positioner is mounted in the body such that the position of the exposure area coincides with a position of a focal plane, defined by the photographing optical system. Then, when using the image sensor, the film positioner is detached from the body and the image sensor is placed in the accommodation space, such that a position of a light-receiving area of the image sensor coincides with the position of the focal plane, along the optical axis. As the film positioner is detached from the body, a focused object image is obtained even when using a large-sized image sensor.

A hybrid camera of the present invention selectively uses one of a photographic film and an image sensor, to record an object image. The hybrid camera has a photographing optical system, a body, and a film positioner. The photographing optical system forms the object image, and the photographing optical system is connected to the body. The film positioner is provided in the body, and defines a position of an exposure area of the photographic film, along an optical axis of the photographing optical system, such that the position of the exposure area coincides with a position of a focal plane, defined by the photographing optical system. The film positioner has an aperture that admits light, directed by the photographing optical system, such that the object image is formed on the exposure area, and the film positioner is formed such that the aperture is enlargable. An accommodation space, which can accommodate the image sensor, is formed by enlarging the aperture. When using the photographic film, an area of the aperture is set to an area corresponding to the exposure area. Then, when using the image sensor, the area of the aperture is enlarged and the image sensor is placed in the accommodation space, such that a position of a light-receiving area of the image sensor coincides with the position of the focal plane, along the optical axis. As the aperture is Car enlarged, the focused object image is obtained even when using the large-sized image sensor.

A hybrid camera of the present invention selectively uses one of a photographic film and an image sensor, to record an object image. The hybrid camera has a photographing optical system, a body, a film positioner, and an optical device. The photographing optical system forms the object image, and the photographing optical system is connected to the body. The film positioner is provided in the body, and defines a position of an exposure area of the photographic film, along an optical axis of the photographing optical system, such that the position of the exposure area coincides with a position of a focal plane, defined by the photographing optical system. The optical device is detachably mounted between the photographing optical system and the film positioner, and shifts the position of the focal plane backward, a long the optical axis. When using the photographic film, the optical device is detached from the body.

Then, when using the image sensor, the optical device is mounted in the body and the image sensor is placed behind the film positioner along the optical axis, such that a position of a light-receiving area of the image sensor coincides with the shifted-position of the focal plane, along the optical axis. As the position of the focal plane is shifted by the optical device, the focused object image is obtained even when using the image sensor.

A hybrid camera of the present invention selectively uses one of a photographic film and an image sensor, to record an object image. The hybrid camera has a photographing optical system, a body, a first back-cover having a supporting-plate, a second back-cover for the image sensor. The photographing optical system forms the object image, and the photographing optical system is connected to the body. The first back-cover for the photographic film is detachably and releasably mounted at the rear side of the body. The second back-cover for the image sensor is detachably mounted at the rear side of the body. The film positioner is provided inside of the first back-cover and defines a position of an exposure area of the photographic film, along an optical axis of the photographing optical system, such that the position of the exposure area coincides with a position of a focal plane, defined by the photographing optical system. An accommodation space, which can accommodate the image sensor, is formed at the rear of the photographing optical system. When using the photographic film, the first back-cover is attached to the body. Then, when using the image sensor, the second back-cover is attached to the body and the image sensor is placed at the accommodation space such that the position of light-receiving area of the image sensor coincides with the position of the focal plane, along the optical axis. As the photographic film is positioned by the first back-cover, the large-sized image sensor can be placed in the accommodation space, and the focused object image is obtained when using the large-sized image sensor.

BRIEF DESCRIPTION OF THE DRAWINGS

The present invention will be better understood from the description of the preferred embodiments of the invention set forth below together with the accompanying drawings in which:

FIG. 10 is a section view showing an inner schematic arrangement of a hybrid camera with a back-cover for a photographic film of a second embodiment.

FIG. 20 is a section view showing an inner schematic arrangement of a hybrid camera with a back-cover for a photographic film of a fourth embodiment.

FIG. 27A is a schematic section view of the hybrid camera showing a position of a light-receiving area in the CCD.

FIG. 27B is a schematic section view of the hybrid camera showing a position of the exposure area of the photographic film.

DESCRIPTION OF THE PREFERRED EMBODIMENTS

Hereinafter, the preferred embodiments of the present invention are described with reference to the attached drawings.

Figure 1:
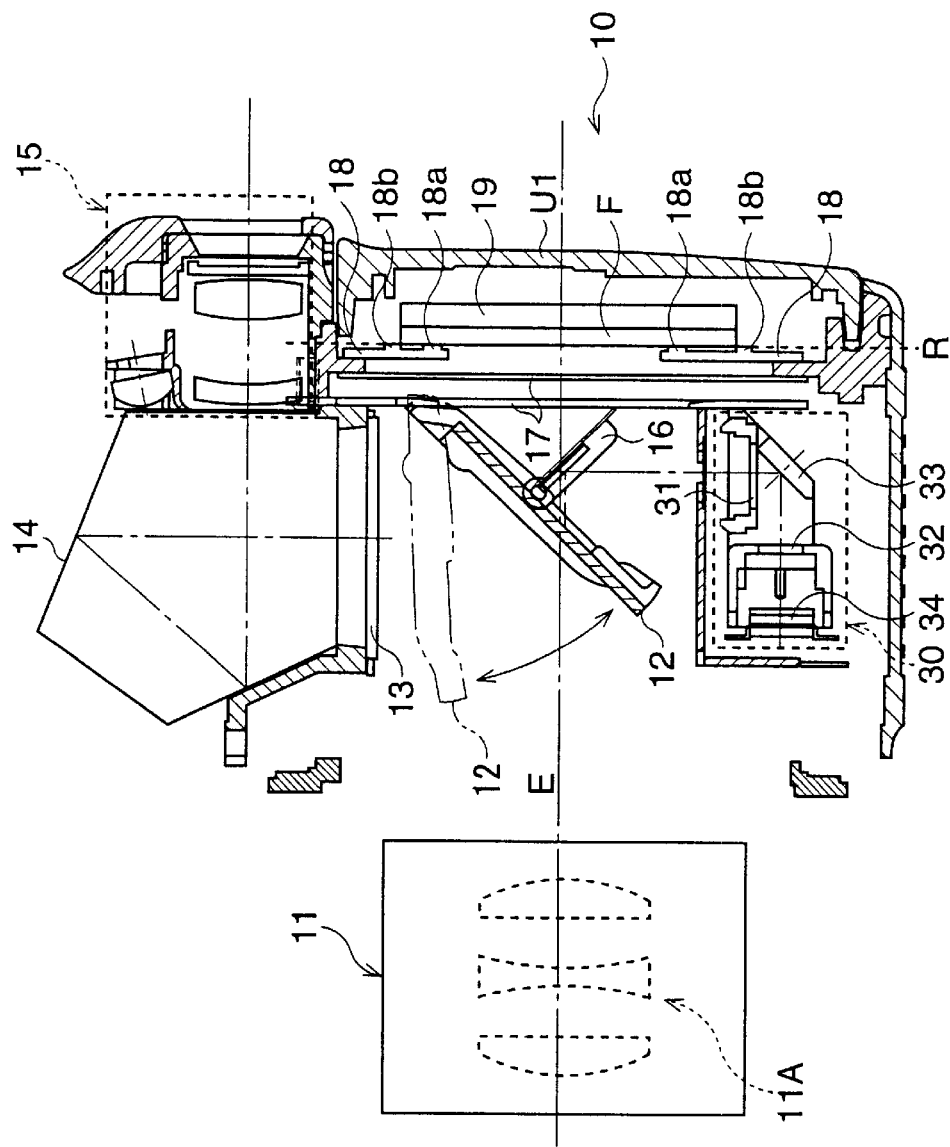
FIG. 1 is a section view showing an inner schematic arrangement of a hybrid camera with a back-cover for a photographic film of a first embodiment.

FIG. 1 is a section view showing an inner schematic arrangement of a hybrid camera of a first embodiment. The hybrid camera of the first embodiment is a single lens reflex (SLR) type camera having a focal plane shutter and an AF (automatic focusing) unit.

The hybrid camera has a camera body 10 and a lens barrel 11 detachably mounted on the body 10. The lens barrel has a photographing optical system 11A and iris diaphragm (not shown), and is detachably mounted on the body 10. The photographing optical system 11A, connected to the body 10 by the lens barrel 11, consists of plural lenses including a zoom lens and optically forms an object image.

A back-cover U1 for a photographic film F (hereinafter, represented by "film back-cover") is attached to the rear side of the body 10, and has a pressure plate 19. The film back-cover is releasable, such that the film back-cover U1 is closed (locked) and opened. Note that, in FIG. 1, an optical axis E, defined by the photographing optical system 11A, is represented by a single chained line.

A quick return mirror 12, placed at the rear of the photographing optical system 11A, rotates between an inclined position (down-position) and a parallel position (up-position), shown by a double-chained line. The quick return mirror 12 is usually positioned at the down position, whereby light, passing through the photographing optical system 11A, is directed to a focusing plate (focusing glass) 13, which is disposed above the quick return mirror 12. By reflection of light on the quick return mirror 12, the object image is formed on the focusing plate 13. Consequently, the object image to be photographed is observed through a pentagonal prism 14 and a viewfinder 15, which form an optical device, by an operator. When a photographing operation is executed, the quick return mirror 12 rotates from the down-position to the up-position, and then is maintained at the up-position for a determined period of time.

A shutter 17, disposed at the rear of the quick return mirror 12, adjusts an amount of exposure. The shutter 17 is so called a focal plane shutter, the shutter 17 having a first blind and a second blind (not shown). When the photographing operation is executed, the shutter 17 opens for the determined period of time. Namely, the first and second blinds move along a vertical direction of the optical axis E, as is well known. When the quick return mirror 12 is rotated to the up-position and the shutter 17 opens, light, passing through the photographing optical system 11A, is directed toward the photographic film F.

A first film-positioning member 18, detachably mounted at the rear of the shutter 17, defines a position of an exposure area of the photographic film F, along the optical axis E. A pair of guide rails 18a, which is provided at the rear side of the first film-positioning member 18, opposite to the photographing optical system 11A, supports the photographic film F, such that the photographic film F is placed at a position of a focal plane, along the optical axis E. The position of the focal plane is defined by the photographing optical system 11A, and is herein represented by "R".

An object image formed on the position "R" of the focal plane is focused, and further an optical distance between the photographing optical system 11A and the position R is equal to an optical distance between the photographing optical system 11A and the focusing plate 13. Therefore, when the photographing operation is executed in a situation in which the focused object image is observed by the operator via the viewfinder 15, the focused object image is recorded on the photographic film F.

The photographic film F is a silver-halide type roll film, and the entire of film F is rolled and accommodated in a film cartridge (not shown). The body 10 has a housing portion for accommodating the film cartridge, and the film cartridge is accommodated in a cartridge space, formed by the housing portion at one side of the body 10 (not shown). The photographic film F is pulled out from the film cartridge and is wound by a spool (not shown) in the side of the body 10, opposite to the side of the cartridge space.

When the film cartridge is accommodated in the body 10 and the film back-cover U1 is locked, the photographic film F is slidably interposed between the pressure plate 19 and the first film-positioning member 18. The pressure plate 19 is provided inside of the back-cover U1 via a leaf spring (not shown).

A pair of guide pieces 18b is attached to the rear side of the first film-positioning member 18, opposite to the photographing optical system 11A. The guide pieces 18b protrude from the rear surface to form a shift path of the photographic film F.

An exposure meter (not shown), provided in the viewfinder 15, measures brightness of an object M, on the basis of light directed to the viewfinder 15 via the quick return mirror 12.

An AF (Automatic Focusing) unit 30, disposed under the quick return mirror 12, has lenses 31 and 32, a mirror 33, and a line sensor 34. A sub mirror 16, attached to the rear side of the quick return mirror 12, reflects light, passing through the photographic optical system. When the quick return mirror 12 is at the down-position, light, passing through the photographic optical system, is reflected on the sub mirror 16, and is directed to the AF unit 30. In the AF unit 30, light is condensed by the lens 31, and directed to the line sensor 34 via the mirror 33 and the lens 32.

Based on the light received by the line sensor 34, a focusing adjustment is automatically executed. In this case, the photographing optical system 11A is driven along the optical axis E, such that the focused object image is formed on the focal plane. Note that, as for an automatic focusing method, a phase difference method is herein applied.

A release button (not shown), provided on an upper surface of the body 10, is a switch for photographing. When the release button is depressed, the object image is recorded on the photographic film F.

Figure 2:
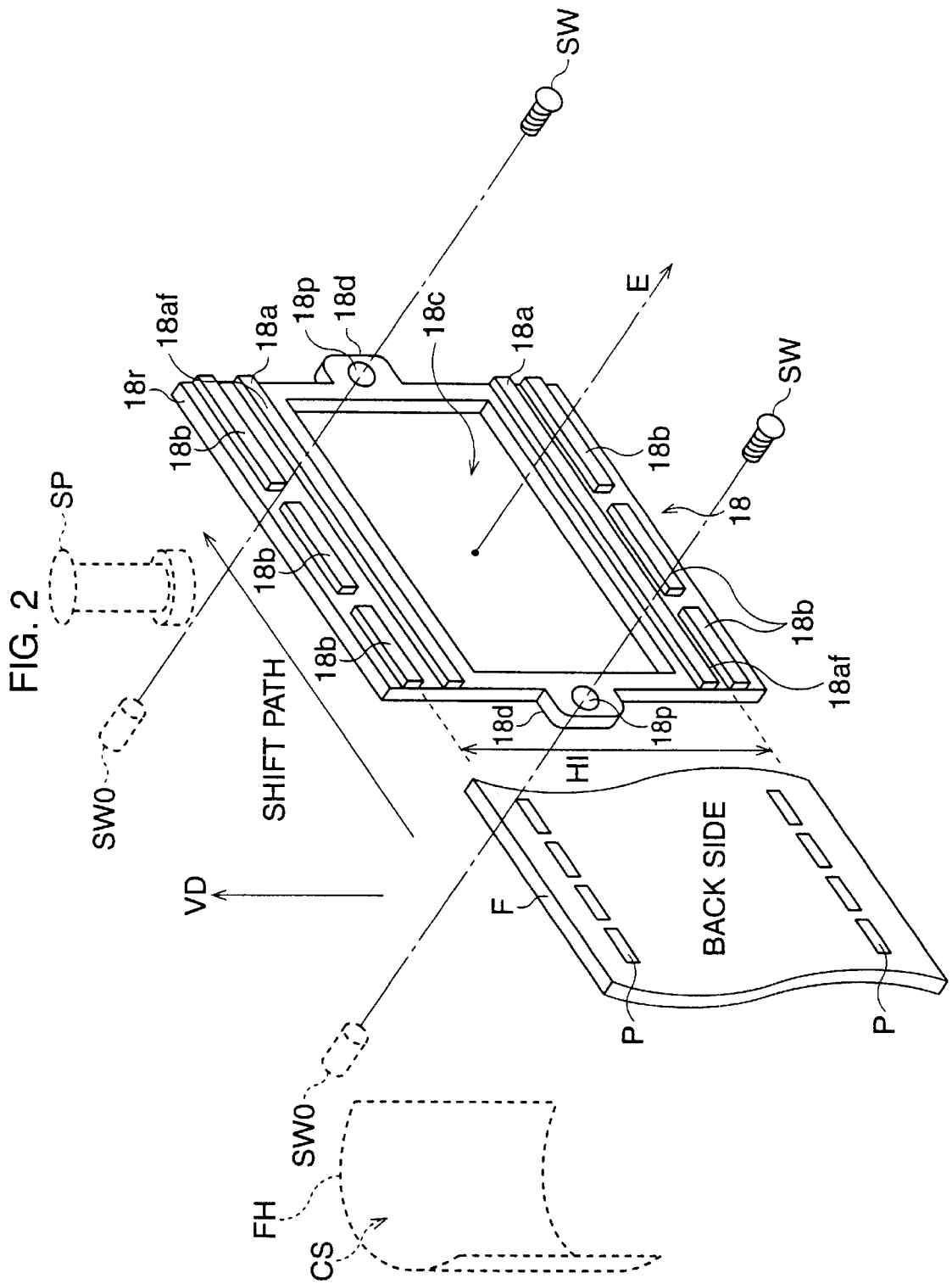
FIG. 2 is a perspective view of a first film-positioning member.

FIG. 2 is a perspective view of the first film-positioning member 18. In FIG. 2, the rear side of the first film-positioning member 18 is shown.

The first film-positioning member 18 is a plate-like member and has a rectangular opening, or aperture 18c. Thus, the light passing through the photographing optical system is received on the photographic film F, placed at the opposite side to the photographing optical system 11A. A frame 18r, which forms the aperture 18c, is detachably mounted in the body 10. An area of the aperture 18c corresponds to an exposure area of the photographic film F, namely, one frame of the photographic film F.

On the frame 18r of the first film-positioning member 18, opposite to the photographing optical system 11A, the pair of guide rails 18a is provided, and extends along the upper and lower edge sides of the aperture 18c. The guide rails 18a have respectively a support surface 18af, parallel to the focal plane, on which the photo graphic film F is placed. The position of the support surface 18af substantially coincides with the position of the focal plane, along the optical axis E. While the film cartridge is installed in the body. 10 and the film back-cover U1 is closed, the photographic film F is securely interposed between the support surface 18af and the pressure plate 19. Thus, the position of the exposure area of the photographic film F is defined at the position R of the focal plane. Note that, the guide rails 18a also have a role of guiding the photographic film F along the shift path.

The pair of guide pieces 18b, respectively consisting of three pieces, are provided on the rear side of the frame 18r and is disposed along the upper and lower side of the guide rails 18a. The length between the pair of guide pieces 18b along a vertical direction VD corresponds to a film width HI, such that the shift path of the photographic film F is formed along the guide pieces 18b. While the photographic film F is wound by the spool SP frame by frame, the photographic film F is conveyed toward the spool along the shift path.

As described above, the first film-positioning member 18, disposed at the rear of the quick return mirror 12, is detachably mounted in the body 10. The first film-positioning member 18 has a pair of tabs 18d on both sides of the frame 18r. In the body 10, screw openings SW0 are formed inside of the cartridge space CS, formed by the cartridge housing FH, and the spool SP, along the shift path. The tabs 18d have respectively an opening 18p for receiving screws SW.

When recording the object image on the photographic film F, the screws SW are inserted into screw openings SWO, formed in the body 10, via the openings 18p, thus the first film-positioning member 18 is fixed to the body 10. Note that, the first film-positioning member 18 is mounted such that the position of the exposure area of the photographic film F coincides with the focal plane, along the optical axis E, as described above.

Figure 3:
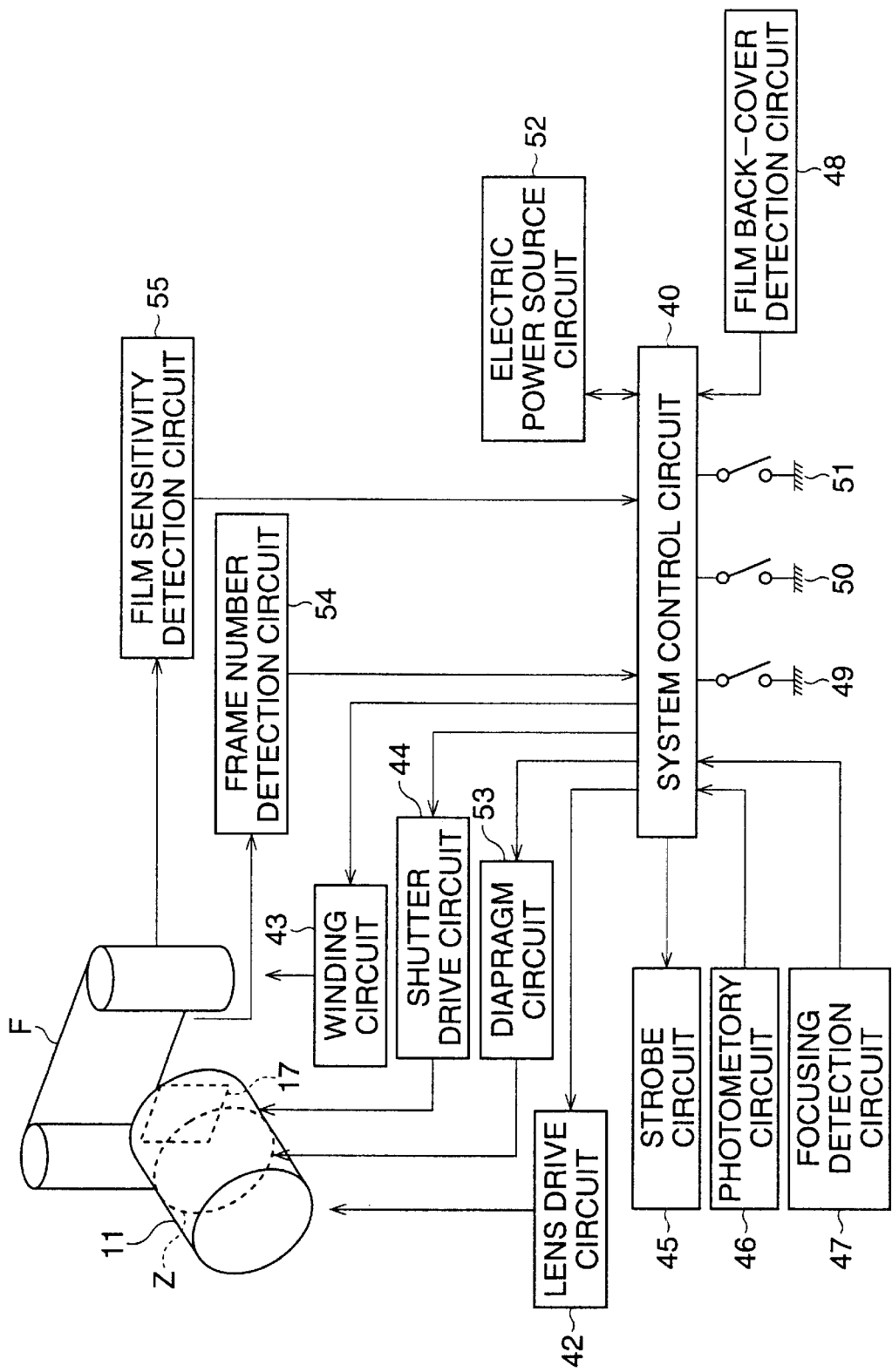
FIG. 3 is a block diagram of the hybrid camera associated with the photographic film.

FIG. 3 is a block diagram associated with the film back-cover U1. In FIG. 3, electric circuits, required when using the photographic film F, are shown. A system control circuit 40 has a CPU (Central Processing Unit, not shown), which controls the hybrid camera as a whole.

An electric power switch 49, a release half-push switch 50, release full-push switch 51 and a film back-cover detection circuit 48 are respectively connected to the system control circuit 40. The release half-push switch 50 and full-push switch 51 are associated with a depressing-condition of the release button provided on the body 10. The film back-cover detection circuit 48 detects whether the film back-cover U1 is attached to the body 10. Note that, electric power is supplied from an electric power source circuit 52. When the electric power is turned ON and the film back-cover U1 is attached to the body 10 and closed, the photographing operation using the photographic film F is executable.

Brightness of the object M is measured by a photometry circuit 46, which measures brightness on the basis of an amount of light detected by the exposure meter provided in the viewfinder 15. Based on brightness of the subject M, a proper exposure value, namely, a shutter speed of the shutter 17 and a diaphragm value of the iris diaphragm Z is determined. A focusing detection circuit 47, incorporated in the AF unit 30, detects whether the object image is focused.

According to the signals output from the focusing detection circuit 47, a movable lens in the photographing optical system 11A is driven by a lens drive circuit 42 such that the object image is focused. When the release button is depressed halfway, brightness of the object M is measured, and the automatic focusing adjustment is executed by the AF unit 30.

The shutter 17 is driven by a shutter drive circuit 44, and the iris diaphragm Z is driven by a diaphragm drive circuit 53. When the release button is fully depressed, the iris diaphragm Z is driven according to the determined diaphragm value and the shutter 17 is driven according to the determined shutter speed.

An electronic flash, namely, a strobe (not shown) is controlled by a strobe circuit 45. A wound number of frames of the photographic film F is measured by a frame number detection circuit 54. A sensitivity of the photographic film F is detected by a film sensitivity detection circuit 55. The winding and rewinding of the film F is controlled by a winding circuit 43.

Figure 4:
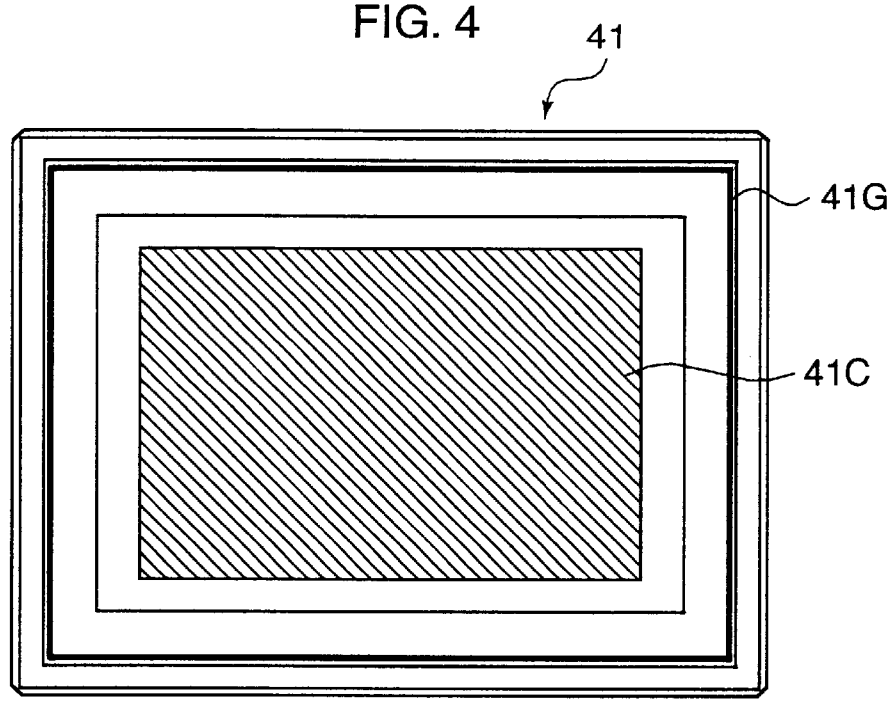
FIG. 4 is a front view of a CCD.
Figure 5:
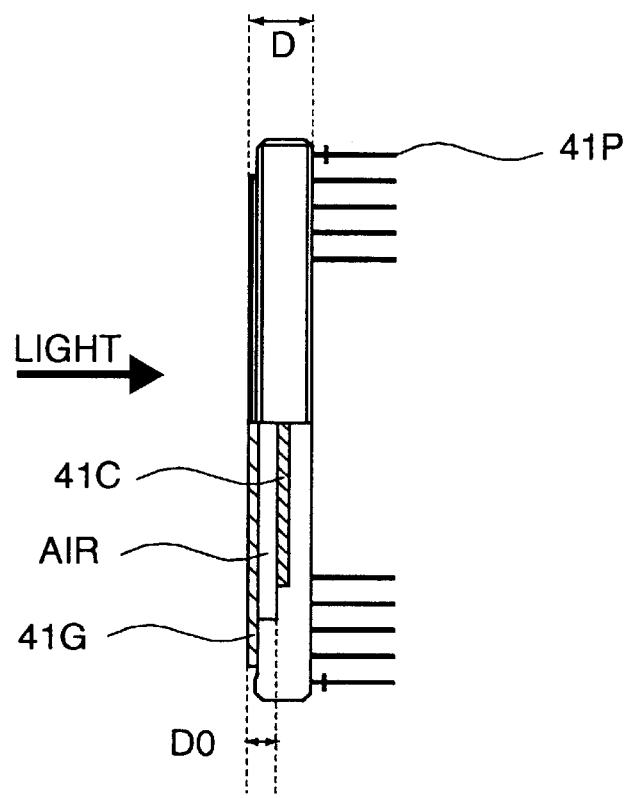
FIG. 5 is a side view partially showing a section of the CCD.

FIG. 4 is front view of a CCD 41, and FIG. 5 is a side view partially showing an inner schematic arrangement of the CCD 41.

The CCD 41 of an image sensor has a photodetector 41C consisting of a plurality of photodiodes. An area of the photodetector 41C, shown by diagonal hatching, is a light-receiving area, on which the object image is formed. A size of the light-receiving area coincides with one frame of the photographic film F, namely, the exposure area of the photographic film F. Therefore, the object image obtained by the CCD 41 is identical to the object image recorded on the photographic film F.

The CCD 41 having a thickness D is covered with a transparent cover glass 41G to protect the photodetector 41C, and air fills a space between the cover glass 41G and the photodetector 41C, as shown in FIG. 5. Therefore, the area of the photodetector 41C, or light-receiving area is under the cover glass 41G. Herein, a distance between the cover glass 41G and the photodetector 41C is represented by "D0". Pins 41P are attached to the rear side of the CCD 41.

As the size of light-receiving area coincides with that of the exposure area of the photographic film F, a size of the CCD 41 is larger than the size of the aperture 18c (shown in FIG. 2), equal to the exposure area of the photographic film F.

Figure 6:
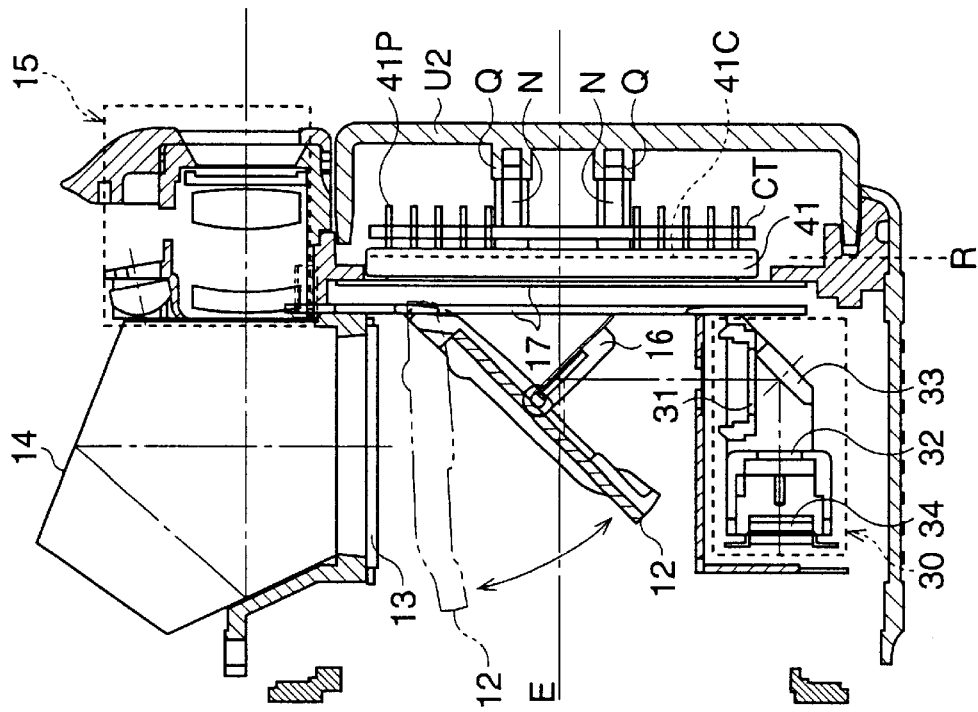
FIG. 6 is a section view showing an inner arrangement of the hybrid camera with a back-cover for the CCD.

FIG. 6 is a view showing an inner schematic arrangement of the hybrid camera with a sensor back-cover U2. The CCD 41 is inside of the sensor back-cover.

Before the sensor back-cover U2 is attached to the body 10, the first film-positioning member 18 (shown in FIG. 1) is detached from the body 10. By detaching the first film-positioning member 18, a sensor accommodation space is formed behind the shutter 17, in which the first film-positioning member 18 was located before being detached. The sensor accommodation space can accommodate the CCD 41, a size of which is larger than the size of the aperture 18c.

When the sensor back-cover U2 having the CCD 41 is attached to the body 10 and closed, the CCD 41 is placed in the accommodation space. Note that, the CCD 41 is attached inside of the sensor back-cover U2, such that the position of the light-receiving area coincides with the position R of the focal plane when the sensor back-cover U2 is closed. At this time, the position of the surface of the CCD 41 is forward of the position R of the focal plane by the distance "D0" shown in FIG. 5, along the optical axis E.

A substrate CT is mounted inside of the sensor back-cover U2 by a pair of fix-screws N. An opening (not shown) is formed in the substrate CT such that the fix-screws N pass through the substrate CT, thus the fix-screws N are respectively inserted in screw openings Q, formed inside of the sensor back-cover U2. The pins 41P are soldered to the substrate CT, whereby the CCD 41 is fixed to the sensor back-cover U2.

An LCD (Liquid Crystal Display) provided on the outer surface of the sensor back-cover U2 (not shown) displays the object image formed on the photodetector 41C, or the light-receiving area of the CCD 41. A mode selector (not shown), provided on the upper surface of the body 10, is operated by the operator to set a mode. For example, one of a diaphragm priority mode, a shutter priority mode, a display mode is selected. An up-button and a down-button, provided on the upper surface of the body 10 (not shown), are operated by the operator when setting the diaphragm value and so on.

Figures 7A, 7B:
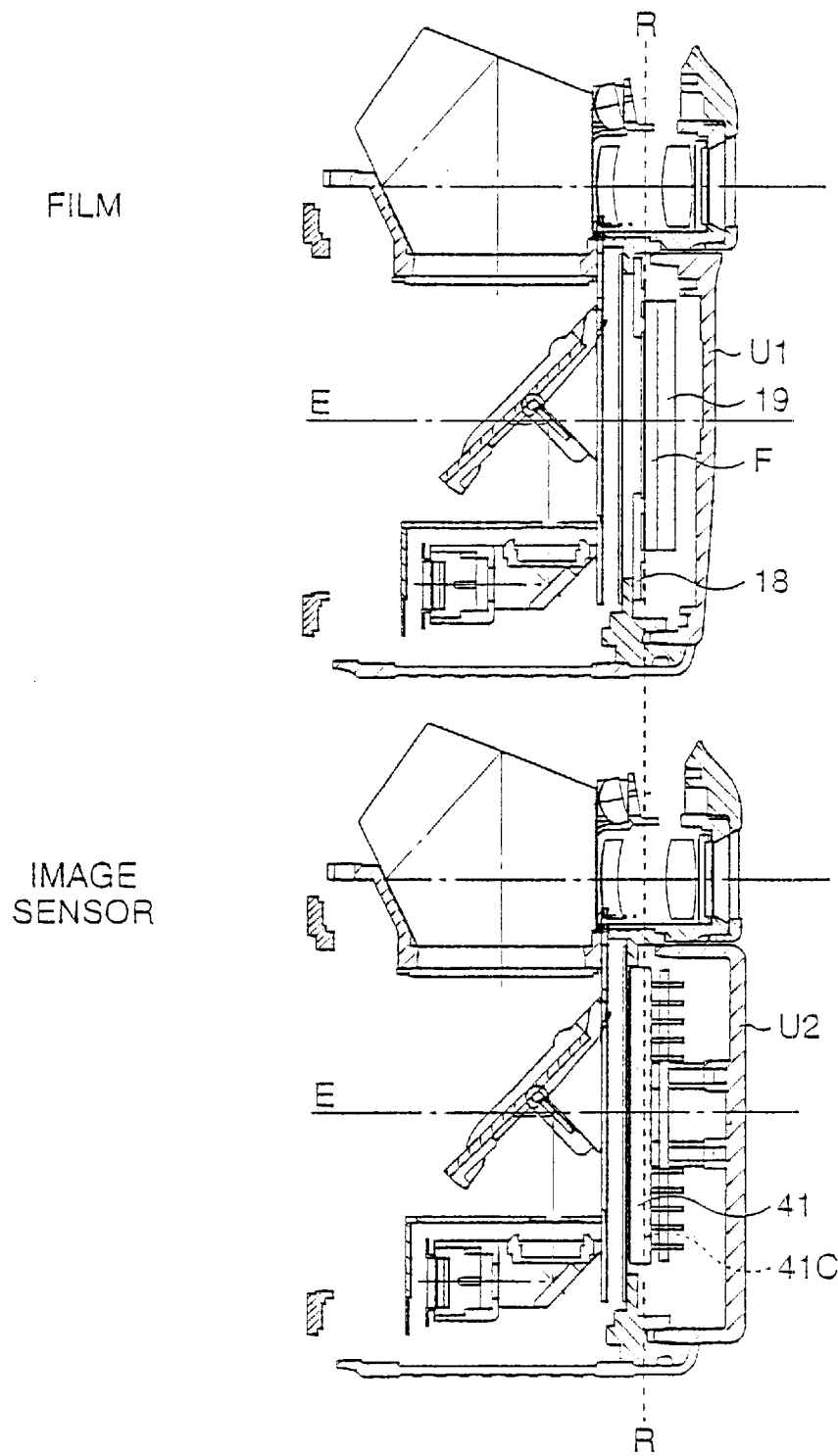
FIG. 7A is a schematic section view of the hybrid camera showing a position of a light-receiving area in the CCD.
FIG. 7B is a schematic section view of the hybrid camera showing a position of the exposure area of the photographic film.

FIG. 7A is a schematic section view of the hybrid camera showing the position of the photodetector 41C in the CCD 41.

FIG. 7B is a schematic section view of the hybrid camera showing the position of the exposure area of the photographic film F.

As described above, when the film back-cover U1 is attached to the body 10, the first film-positioning member 18 is mounted in the body 10. Then, when the photographic film F is installed in the body 10, the position of the exposure area of the photographic film F coincides with the position R of the focal plane.

On the other hand, when the sensor back-cover U2 is attached to the body 10 in place of the film back-cover U1, the first film-positioning member 18 is detached from the body 10. Then, when the sensor back-cover U2 is closed, the CCD 41 is placed in the sensor accommodation space, wherein the position of the light-receiving area (the photodetector 41C) coincides with the position R of the focal plane, along the optical axis E.

Figure 8:
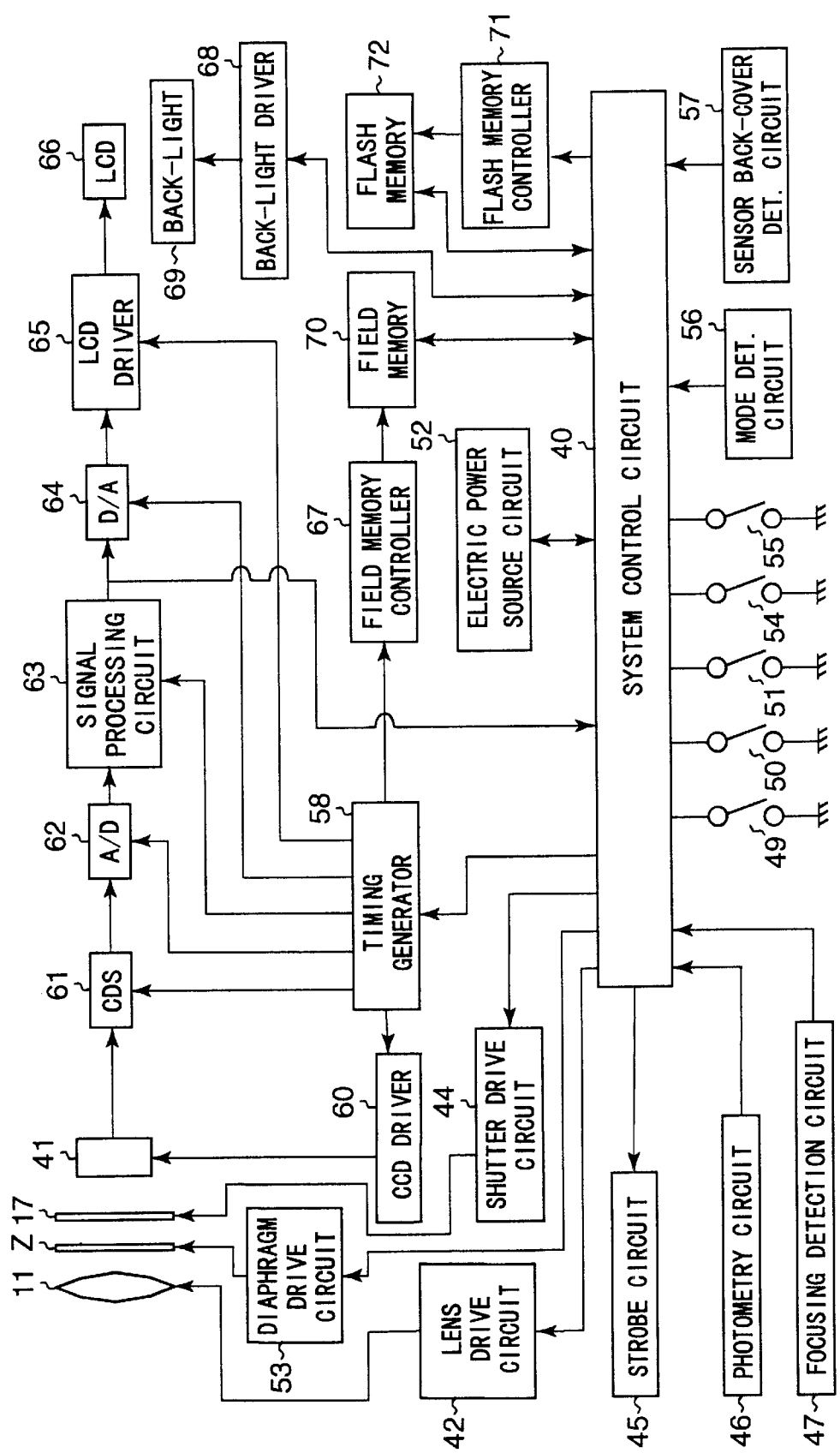
FIG. 8 is a block diagram of the hybrid camera associated with the CCD.

FIG. 8 is a block diagram of the hybrid camera with the film back-cover U2. In FIG. 8, electric circuits, required when using the CCD 41, are shown. Note that, when the sensor back-cover U2 is attached to the body 10, the substrate CT provided with the sensor back-cover U2 is connected to the electric circuit provided in the body 10.

An up-switch 54 associated with the up-button, a down-switch 55 associated with the down-button, a mode-detection circuit 56 and a sensor back-cover detection circuit 57 are respectively connected to the system control circuit 40. In the mode-detection circuit 56, a mode selected by the operator is detected. The sensor back-cover detection circuit 57 detects whether the sensor back-cover U2 is attached to the body 10.

When the photographing operation is executed, namely, the release button is fully depressed, the object image is formed on the photodetector 41C in the CCD 41 by rotation of the quick return mirror 12 and opening of the shutter 17. Based on the object image formed on the photodetector 41C, analog image-pixel signals corresponding to the object image are generated. The CCD 41 is driven by a CCD driver 60, thus the image-pixel signals of one frame worth are fed to a CDS (Correlation Double Sampling) circuit 61, wherein the noise is removed. The image-pixel signals are fed from the CDS circuit 61 to an A/D converter 62, wherein the analog image-pixel signals are converted to digital image-pixel signals. The digital image-pixel signals are fed to a signal processing circuit 63.

In the signal processing circuit 63, the digital image-pixel signals are subjected to various processing, such as a gamma correction, and then fed to a field memory 70 via the system control circuit 40, whereby one frame worth of the object image is temporarily stored in the field memory 70. The field memory 70 is controlled by a field memory controller 67. Then, the digital image-pixel signals are again fed to the system control circuit 40, wherein the digital image-pixel signals are subjected to compression processing. The compressed signals are stored in the flash memory 72 as image data. Note that, the flash memory 72 is controlled by a flash memory controller 71. When the display-mode is selected, the image data is read from the flash memory 72 and subjected to an expansion processing in the system control circuit 40. Then, the decoded digital signals are temporarily stored in the field memory 70. The digital signals are fed to a D/A converter 64, wherein the digital signals are converted to the analog signals and fed to an LCD driver 65. Based on the analog signals, the LCD driver 65 drives the LCD 66, provided on the outer surface of the sensor back-cover U2. A back-light 69 for the LCD 66 is turned ON by a back-light driver 68, thus the object image is displayed on the LCD 66. A timing generator 58 outputs a sample clock pulse to the CCD driver 60, the CDS circuit 61, the A/D converter 62, the signal processing circuit 63, the D/A converter 64, the LCD driver 65 and the field memory controller 67 to adjust a timing of signal processing.

Figure 9:
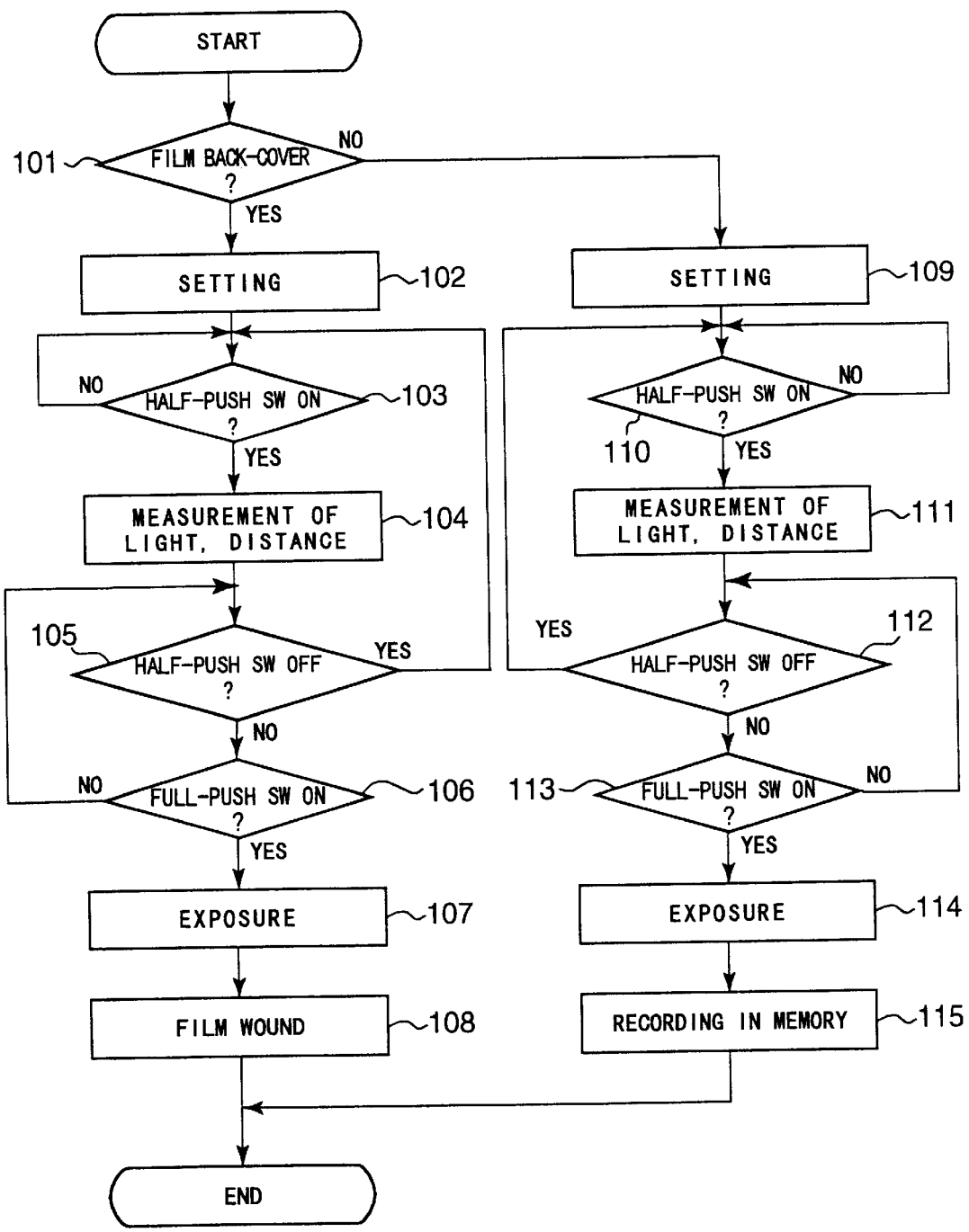
FIG. 9 is a flowchart showing a photographing operation.

FIG. 9 is a flowchart showing a photographing operation. When either the film back-cover U1 or the sensor back-cover U2 is attached to the body 10, this routine is started.

In step 101, it is determined whether the film back-cover U1 is attached to the body 10. When it is determined that the film back-cover U1 is attached to the body 10, the process goes to Step 102. Note that, the first film-positioning member 18 is mounted in the body 10 in advance.

In Step 102, the system control circuit 40 is set such that the photographing operation using film F can be executed. Then, at step 103, it is determined whether the release half-push switch 50 is turned ON by depressing the release button halfway. When it is determined that the release half-push switch 50 is turned ON, the process proceeds to Step 104. Conversely, when it is determined that the release half-push switch 50 is not turned ON, Step 103 is repeatedly executed until the release half-push switch 50 is turned ON.

In Step 104, brightness of the object image and the distance between the hybrid camera and the object M are respectively measured, thus the exposure value, namely, the shutter speed and the diaphragm value is determined. Further, the focusing adjustment is automatically executed. When Step 104 is executed, the process goes to Step 105.

In Step 105, it is determined whether the release half-push switch 50 is turned OFF by the release button being released by the operator. When it is determined that the release half-push switch 50 is turned OFF, the process returns to Step 103. On the other hand, when it is determined that the release half-push switch 50 is not turned OFF, the process goes to Step 106. In Step 106, it is determined whether the release full-push switch 51 is turned ON by fully depressing the release button. When it is determined that the release full-push switch 51 is turned ON, the process goes to Step 107. On the other hand, when it is determined that the release full-push switch 51 is not turned ON, the process returns to Step 105.

In Step 107, the iris diaphragm Z is stopped down according to the diaphragm value obtained at Step 104. Then, the shutter 17 is opened for determined period, so that the film F is exposed by light passing through the photographing optical system 11A and the aperture 18c, and thus the object image is formed on the exposure area of the film F. Namely, the object image is recorded on the photographic film F. When Step 107 is completed, the process goes to Step 108.

In Step 108, the film F is wound by the winding circuit 43, so that the film F is moved along the shift path by one frame worth. When Step 108 is completed, the photographing operation is terminated.

On the other hand, when it is determined that the Film back-cover U1 is not attached to the body 10 at Step 101, namely, the sensor back-cover U2 is attached to the body 10, the process goes to Step 109. Note that, in this case, the first film-positioning member 18 is detached from the body 10 in advance.

In Step 109, the system control circuit 40 is set such that the photographing operation using the CCD 41 can be executed. The execution of Steps 110 to 114 corresponds to the execution of Steps 103 to 107. Thus, the object image is formed on the photodetector 41C, so that the image-pixel signals are generated. In Step 115, the image pixel signals are read from the CCD 41, and are subjected to determined processing, so that the compressed digital signals are generated. The compressed image signals are stored in the flash memory 72 as image data. When Step 115 is completed, the photographing operation is terminated.

As aforementioned, in the first embodiment, the first film-positioning member 18 is detachably mounted in the body 10, whereby the focused object image is obtainable when using the large-sized CCD 41 and when using the photographic film F. Then, as the area of the photodetector 41C corresponds to the exposure area of the photographic film F, the object image obtained by the CCD 41 is identical to the object image obtained by the photographic film F, and a high quality image, substantially equal to that of the photographic film F, is obtained. Further, as the position of the light-receiving area in the CCD 41 coincides with the position of the exposure area of the photographic film F, the focused object image is formed on the photodetector 41C, which the operator can observe via the viewfinder 15, and then a series of interchangeable lenses for the conventional SLR camera can be used.

As the first film-positioning member 18 is attached to the body 10 by screwing, an attachment and detachment of the first film-positioning member 18 is easy for the operator. Further, the first film-positioning member IS and the body 10 having screw-opening SWO can be easily produced by modifying a conventional SLR type camera having the focal plane shutter.

Note that, the hybrid camera may be an other type of camera, such as a lens-united SLR camera having a lens shutter, which is so called a lens shutter camera, and so on. Further, a CCD having a light-receiving area, which does not coincide with the exposure area, may be applied.

FIGS. 10 to 14 show a hybrid camera of a second embodiment. The second embodiment is different from the first embodiment in regard to the first film-positioning member. Since other portions are similar to those of the first embodiment, and designations remain the same and descriptions are omitted.

FIG. 10 is a section view showing an inner schematic arrangement of the hybrid camera with the film back-cover U1.

In the hybrid camera 10, a second film-positioning member 18' is mounted in the camera body 10. Similarly to the first embodiment, the second film-positioning member 18' has a pair of guide rails 18'a and a pair of guide pieces 18'b. However, the second film-positioning member is undetachable.

Figure 11:
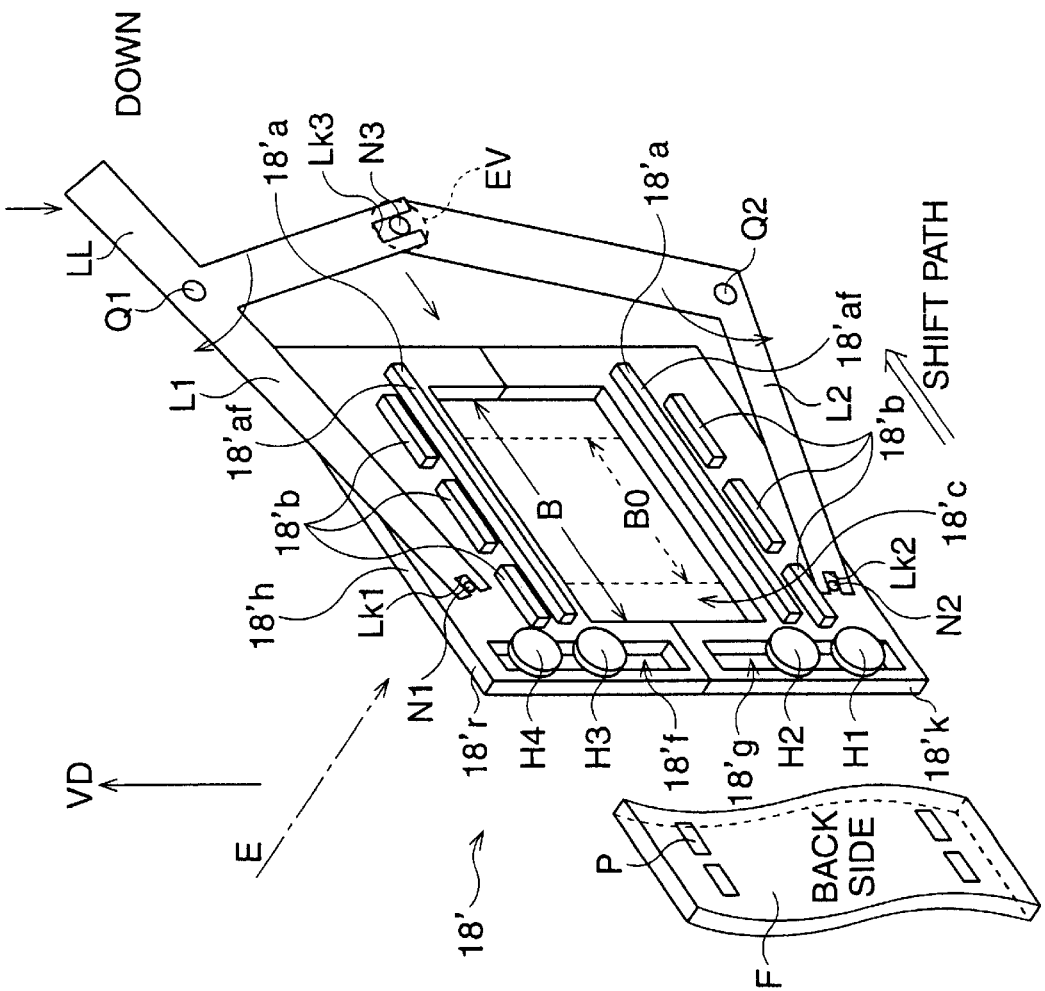
FIG. 11 is a perspective view showing a second film-positioning member.

FIG. 11 is perspective view showing the second film-positioning member 18'.

The second film-positioning member 18' consists of an upper U-shaped member 18'h and a lower U-shaped member 18'k.

The upper U-shaped member 18'h and the lower U-shaped member 18'k face each other so as to form an aperture 18'c for admitting light, directed by the photographing optical system 11A. When the photographic film F is used, the upper and lower U-shaped members 18'h, 18'k are engaged with each other, to form the shift path, as shown in FIG. 11.

Similarly to the first embodiment, a pair of guide pieces 18 b and a pair of guide rails 18'a having a support surface 18'af are provided at the rear side of the second film-positioning member 18', opposite to the photographing optical system 11A. The film F is fed toward the spool along the shift path. A length of the aperture 18'e along the shift path, (shown by "B") corresponds to the width of the CCD 41 and is longer than a length of one frame of the photographic film F (shown by "B0"). However, light passing through the photographing optical system 11A can not reach any area apart from the exposure area of the photographic film F.

A drive-lever L1 is fastened to the body 10 at a pivot shaft Q1 such that the drive-lever L1 is pivotable around the pivot shaft Q1. A notch LK1, formed in one end edge of the drive-lever L1, is engaged with a pin N1 provided on the rear side of the upper U-shaped member 18'h, thus the drive-lever L1 is connected to the upper U-shaped member 18'h via the pin N1. According to the pivoting of the drive-lever L1, the upper U-shaped member 18'h moves upwardly or downwardly, along a vertical direction VD. Note that, the vertical direction VD is a direction, which is vertical and a right angle to the shift path.

A driven-lever L2 is fastened to the body 10 at the pivot shaft Q2 such that the driven-lever L2 is pivotable around the pivot shaft Q2. A notch LK2, formed at one end edge of the driven-lever L2, is engaged with a pin N2, which is provided on the rear side of the lower U-shaped member 18'k, the driven-lever L2 being connected to the lower U-shaped member 18'k via the pin N2. According to the pivoting of the driven-lever L2, the lower U-shaped member 18'k moves upwardly or downwardly, along the vertical direction VD.

A notch LK3, formed in the other end edge of the drive-lever L1, opposite to the notch LK1, is engaged to a pin N3, which is provided on the other end of the driven-lever L2. Thus, the drive-lever L1 is connected to the driven-lever L2 via the pin N3. The pin N3 is not fixed to the body 10, namely, an engaging portion EV between the drive-lever L1 and the driven-lever L2 is not fixed to the body 10.

The upper U-shaped member 18'h has an upper guide-opening 18'f, which is provided for film cartridge space side and pass pins H3, H4. The pins H3, H4 are respectively inserted into upper-holes formed in the body 10 (not shown), through the guide -opening 18'f. The upper guide-opening 18'f defines a moving direction of the upper U-shaped member 18'h, namely, the vertical direction VD.

Similarly to the upper U-shaped member 18'h, the lower U-shaped member 18'k has a guide-opening 18'g for passing pins H1, H2. The pins H1, H2 are respectively inserted into lower-holes formed in the body 10 (not shown), through the guide-opening 18'g. The guide-opening 18'g defines a moving direction of the lower U-shaped member 18'k, namely, the vertical direction VD.

An operating portion LL on the drive-lever L1, extending from the pivot shaft Q1, is pressed by the operator, to move the upper and lower U-shaped member 18'h, 18'k, along the vertical direction VD.

When the operation portion LL is pressed toward the down-direction on the condition that the size of the aperture 18'c corresponds to the size of one frame, as shown in FIG. 11, the drive-lever L1 pivots clockwise. Then, the upper U-shaped member 18'h is moved upwardly according to the pivoting of the drive-lever L1. When the driver-lever L1 pivots clockwise, the engaging portion EV moves toward the second film-positioning member 18', so that the driven-lever L2 pivots counterclockwise. Thus, the lower U-shaped member 18'k is moved downwardly. As the upper and lower U-shaped members 18'h, 18'k are respectively moved by the pivoting of the drive-lever L1 and the driven-lever L2, the area of the aperture 18'c is enlarged, as shown in FIG. 12.

Note that, a shifting-amount of the upper U-shaped member 18'h by the pivoting of the drive-lever L1 is equal to that of the lower U-shaped member. 18'k by the pivoting of the driven-lever L2. Namely, a center of the aperture 18'does not change.

Figure 12:
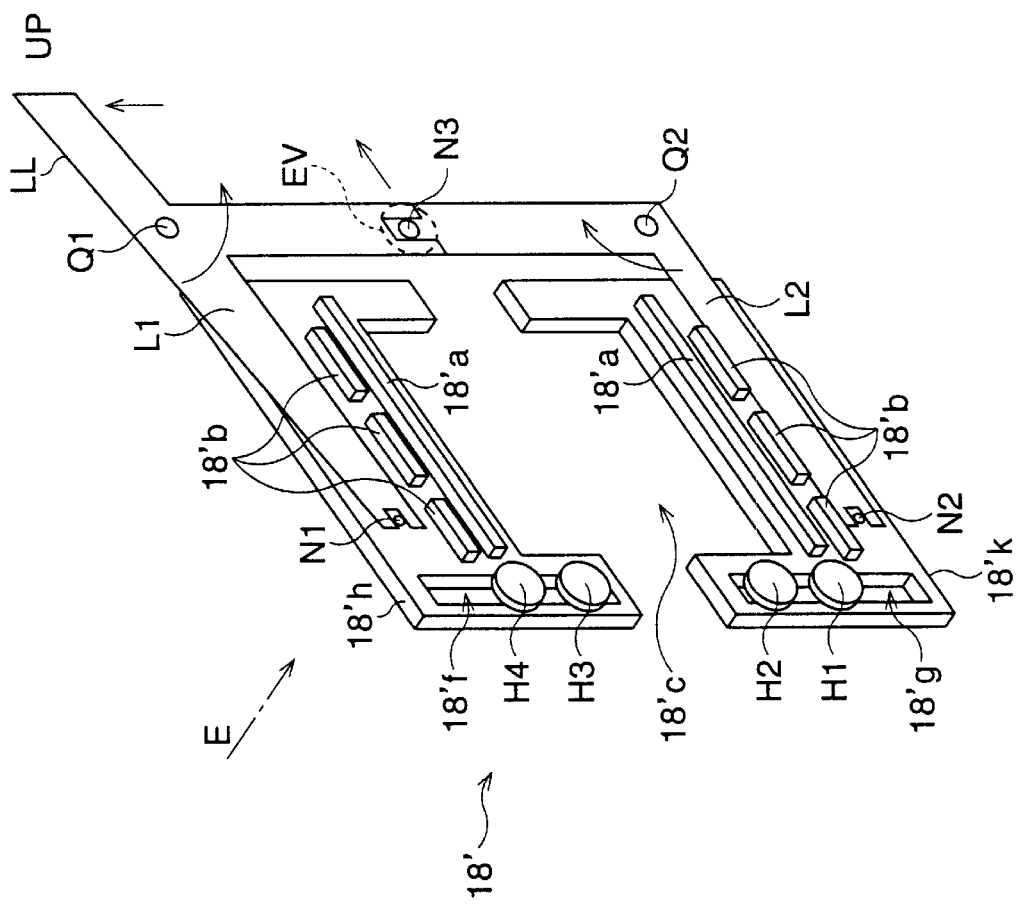
FIG. 12 is a perspective view showing the second film-positioning member of FIG. 11 in different orientation.

In the case that the upper U-shaped member 18'h is moved to a top position and the lower U-shaped member 18'k is moved to bottom position, as shown in FIG. 12, the CCD 41 can be accommodated in the enlarged aperture 18'c. Namely, the sensor accommodation space is formed in the body 10, at the rear of the shutter 17, along the optical axis E.

On the other hand, when the operating portion LL is pressed toward the up-direction by the operator in the case that the aperture 18'c is enlarged as shown in FIG. 12, the drive-lever L1 pivots counterclockwise, and the driven-lever L2 pivots clockwise depending on the pivoting of the drive-lever L1. Thus, the upper U-shaped member 18'h is moved downwardly and the under U-shaped member 18'k is moved upwardly until the upper U-shaped member 18'h and the under U-shaped member 18'k engage each other, as shown in FIG. 11.

In this way, the aperture 18'c is enlargable, such that the CCD 41 is accommodated and the position of the light-receiving area coincides with the position of the focal plane.

Figure 13:
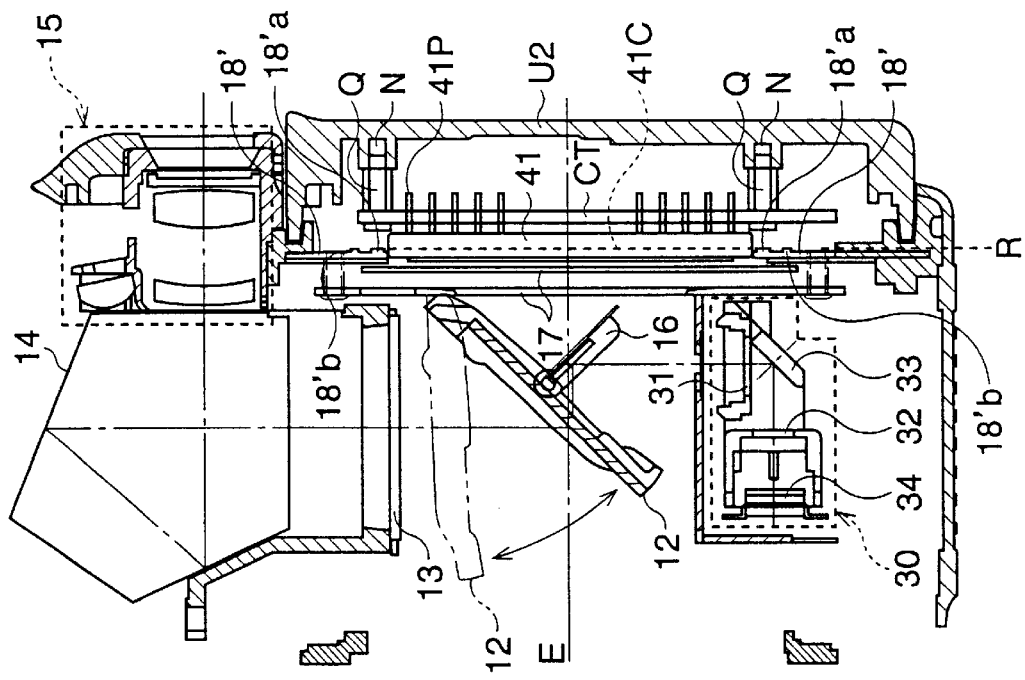
FIG. 13 is a section view showing an inner arrangement of the hybrid camera with a back-cover for the CCD.

FIG. 13 is a section view showing an inner schematic arrangement of the hybrid camera with a sensor back-cover U2.

When the sensor back-cover U2 is attached to the body 10, the operating portion LL on the drive lever L1 is pressed toward the down-direction, thus the aperture 18'c is enlarged, as shown in FIG. 12. Then, when the sensor back-cover U2 is closed, the CCD 41 is placed in the sensor accommodation space such that the position of the light-receiving area (photodetector 41C) coincides with the position of the focal plane, along the optical axis E.

Figures 14A, 14B:
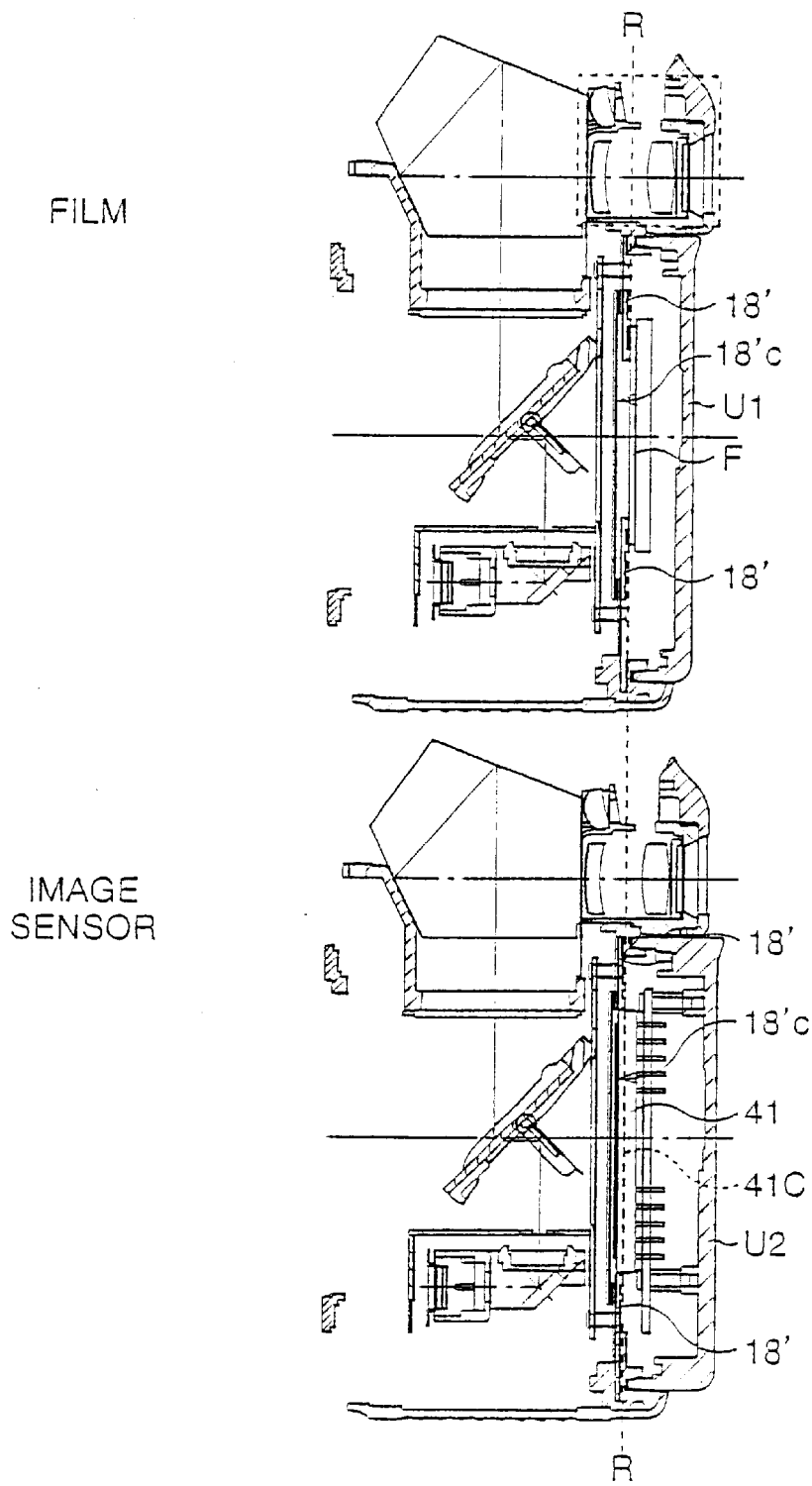
FIG. 14A is a schematic section view of the hybrid camera showing a position of a light-receiving area in the CCD.
FIG. 14B is a schematic section view of the hybrid camera showing a position of the exposure area of the photographic film.

FIG. 14A is a section view of the hybrid camera showing the position of the exposure area FIG. 14B is a schematic section view of the hybrid camera showing the position of the light-receiving area.

As shown in FIG. 14, both the position of the light-receiving area (photodetector 41C) and the position of the exposure area of the photographic film F coincide with the position of the focal plane, along the optical axis E.

As describe above, in the second embodiment, the aperture 18'c is enlarged by pivoting the drive-lever L1 and the driven-lever L2, thus the sensor accommodation space is formed. Accordingly, the focused object image can be obtained even when using the CCD 41. As the second film-positioning member 18'is not needed to be detached from the body 10 as shown in the first embodiment, the CCD 41 can be placed in the sensor accommodation space easily.

Note that, the second film-positioning member 18'may consist of two plate-like members, which have a U-shaped opening respectively. In this case, the aperture is formed in such a manner that the two U-shaped openings face each other. When enlarging the aperture, the two plate-like members should be moved such that the aperture is separated into the two U-shaped openings, along the vertical direction VD, such that the sensor accommodation space is formed.

Note that, the hybrid camera may be an other type of camera, such as a lens-united SLR camera having a lens shutter, which is so called a lens shutter camera, and so on.

FIGS. 15 to 19 show a hybrid camera of a third embodiment. The third embodiment is different from the first embodiment in that the focal plane is shifted when using the image sensor. Since other portions are similar to those of the first embodiment, designations remain the same and descriptions are omitted.

Figure 15:
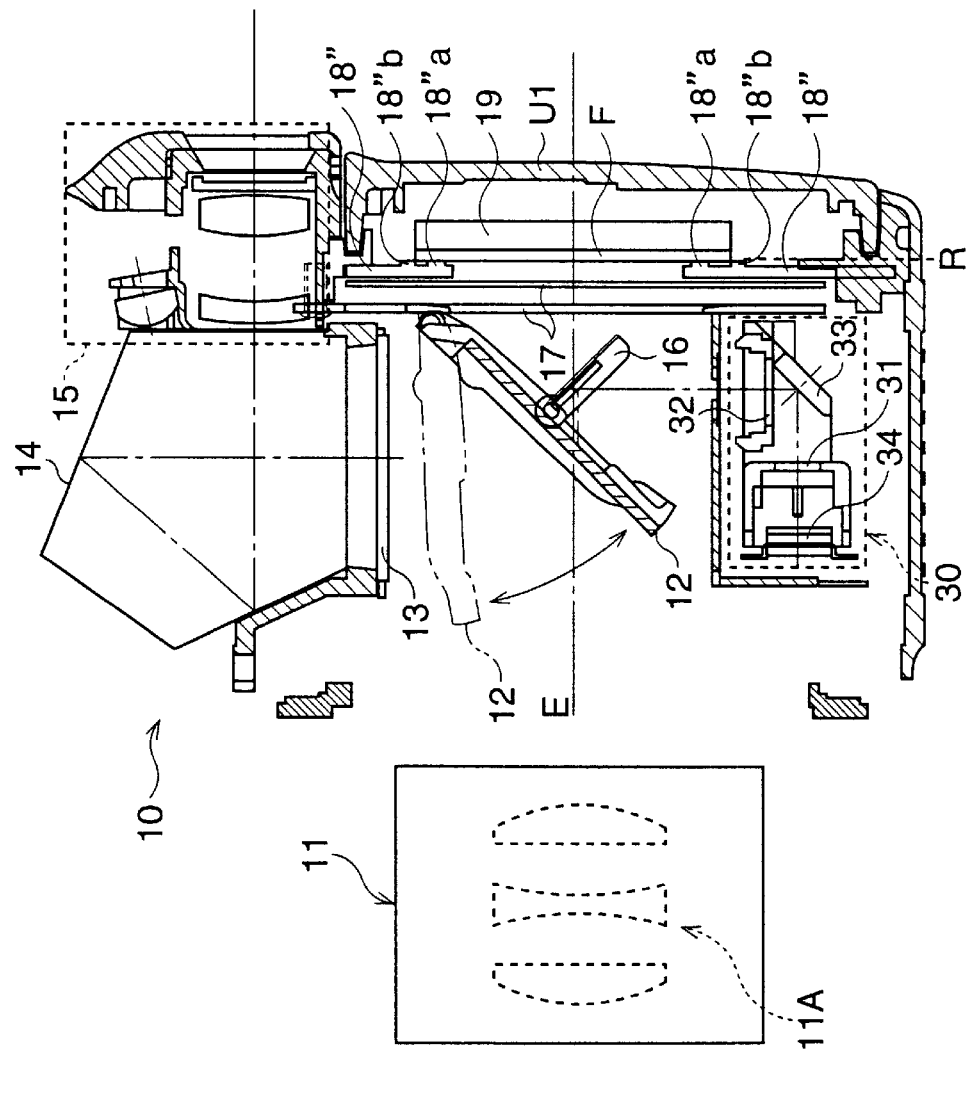
FIG. 15 is a section view showing an inner schematic arrangement of a hybrid camera with a back-cover for a photographic film of a third embodiment.

FIG. 15 is a section view showing an inner schematic arrangement of the hybrid camera with the film back-cover U1.

The photographic film F is interposed between the pressure plate 19 and a third film-positioning member 18" when the film back-cover U1 is closed, whereby the photographic film F is positioned such that the position of the exposure area coincides with the position R of the focal plane. The third film-positioning member 18" is undetachably provided in the body 10.

Figure 16:
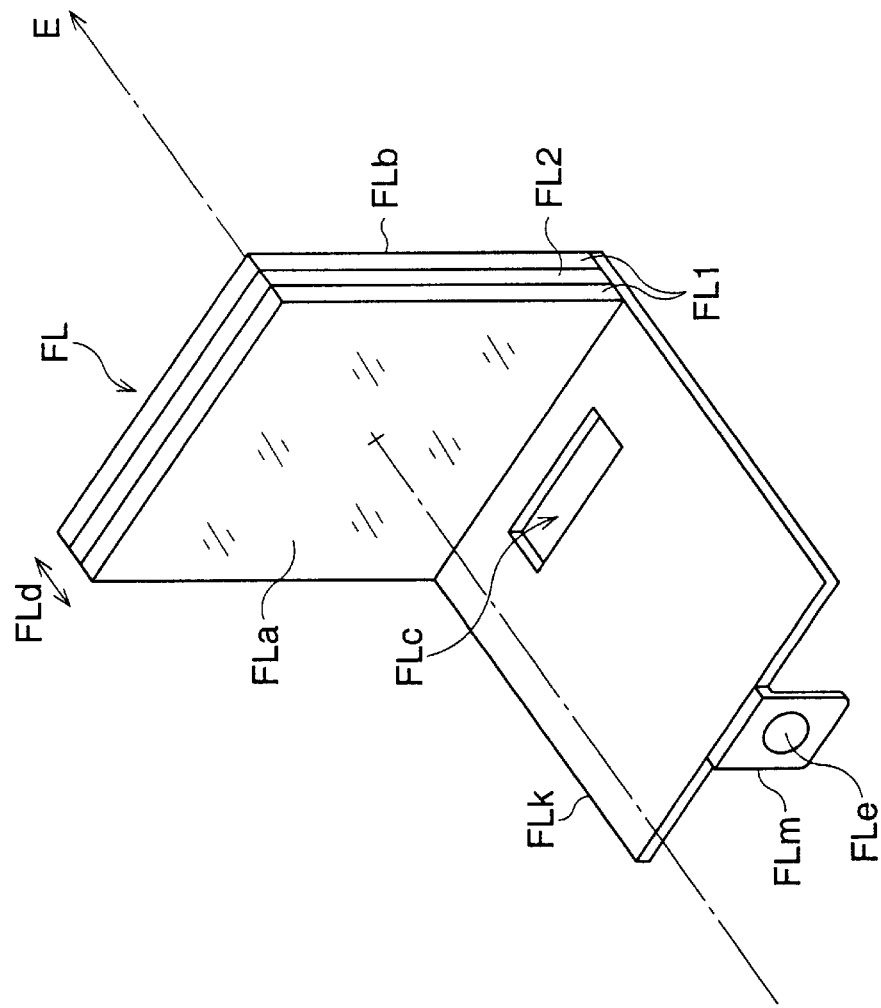
FIG. 16 is a perspective view showing a filter

FIG. 16 is a perspective view of an optical filter, detachably provided in the body 10.

A filter FL, composed of two low-pass filters FL1 and an infrared-light absorption filter FL2, is a photographic (optical) filter and is formed in layers, wherein the infrared-light absorption filter FL2 is interposed between the two low-pass filters FL1. The low-pass filters FL1 and the infrared-light absorption filter FL2 are rectangular-shaped, and the size of the low-pass filter FL1 and the infrared-light absorption filter FL2 is the same. Note that, the size of the low-pass filters FL1 and the infrared-light absorption filter FL2 are deter, mined such that all light, directed by the photographing optical system 11A, passes through the filter FL.

As well known, the low-pass filters FL1 lower a response of spatial frequency more than "Niequist" frequency, as for MTF (Modulation Transfer Function), so as to suppress a "moiré". The infrared-light absorption filter FL2 cuts off the infrared light, namely, absorbs only the infrared light. The low-pass filters FL1 and the infrared-light absorption filter FL2 are molded from a UV (ultraviolet)-light hardening resin.

A front surface FLa of the filter FL, in which light from the photographing optical system 11A enters, and a back surface FTb of the filter FL, from which light which entered the filter FL emits, are parallel to the focal plane, respectively. Namely, a thickness FLd of the filter FL along the optical axis E is constant. A refraction of the filter FL depends on a refraction of the low-pass filters FL1 and the infrared absorption filter FL2.

The filter FL is attached to a fix-plate FLk for fixing the filter F to the body 10, in which a plate-opening FLc is formed. The plate-opening FLc guides light, directed by the sub mirror 16, toward the AF unit 30 provided under the quick return mirror 12. A screw-tab FLm, in which an opening FLe for a screw is formed, is provided at the fix-plate FLk, such that the fix-plate FLk is fastened to the body 10 by screwing. Thus, the filter FL is detachably mounted in the body 10 via the fix-plate FLk.

Figure 17:
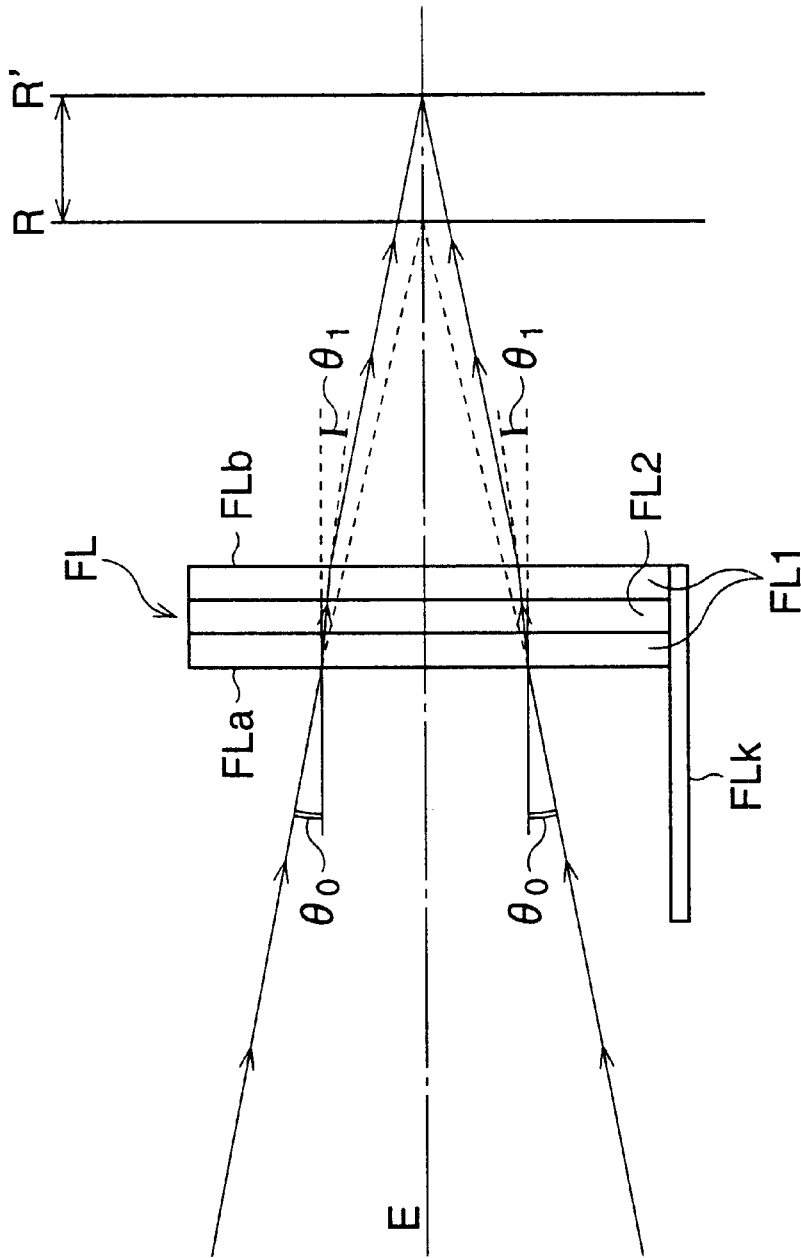
FIG. 17 is a view showing a path of light though the filter.

FIG. 17 shows a path of light passing through the filter FL. Note that, the refraction of the low-pass filter FL1 and the refraction of the infrared-light absorption filter FL2 are the same herein.

When the filter FL is not provided in the body 10, light passing through the photographing optical system 11A is converged at the position R of the focal plane along the optical axis E, as shown by broken line. Namely, the object image is focused at the position R of the focal plane. Generally, the filter FL has an index of refraction, whereby a progress direction of light, entering into the filter FL, changes inside the filter FL, as shown by solid line. In FIG. 17, an angle of incidence is shown by "$\theta_0$", and an angle of refraction is shown by "$\theta_1$". As the index of the refraction is more than "1", light passing through the filter FL converges at a position R' by changing the progress direction. Namely, the position R of the focal plane along the optical axis E is shifted to the position R' by the filter FL. A distance between the position R and the position R' is equal to the interval "D0" between the position of the cover glass 41G and the position of the photodetector 41C, shown in FIG. 4.

Figure 18:
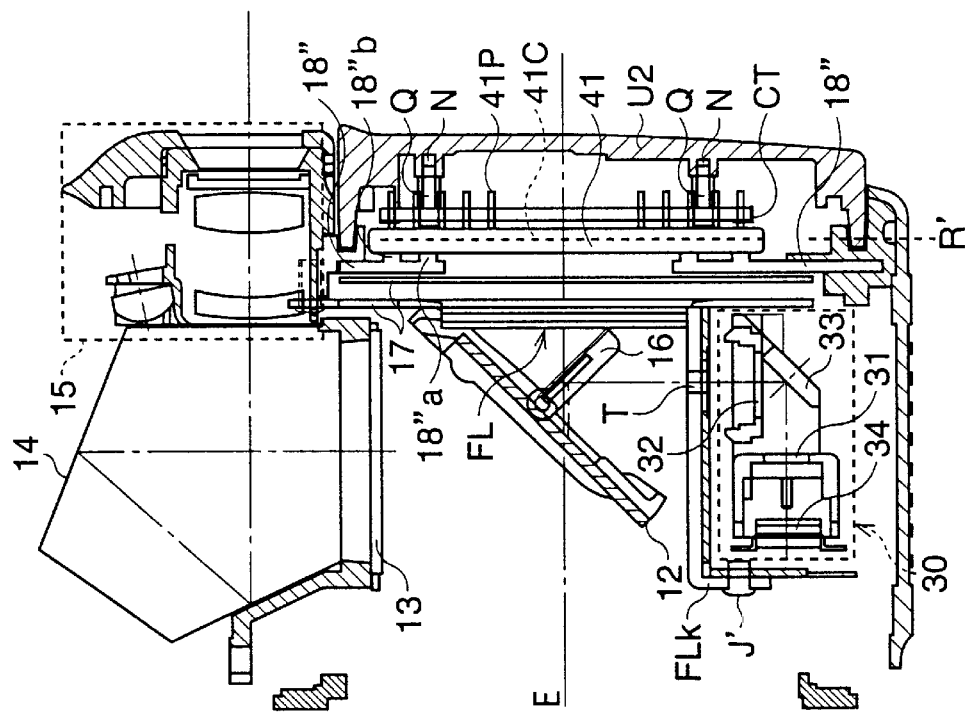
FIG. 18 is a section view showing an inner arrangement of the hybrid camera with a back-cover for the CCD.

FIG. 18 is a section view showing inner schematic arrangement of the hybrid camera with the sensor back-cover U2.

The CCD 41 is attached inside of the sensor back-cover U2 such that the front surface of CCD 41 is positioned at the position of the support surface 18"af of the third film-positioning member 18". By shifting the quick return mirror 12 to the up-position (shown in FIG. 15), the filter FL is inserted into the body 10 and is placed between the quick return mirror 12 and the shutter 17. The fix-plate FLk is fixed to the body 10 by putting a screw J' into a hole formed in the body 10.

Figure 19A:
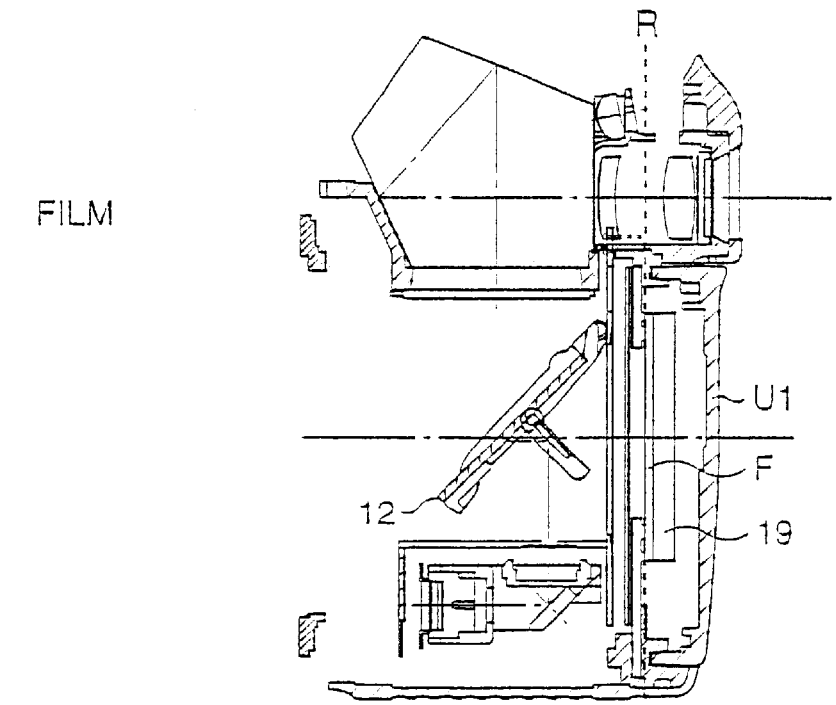
FIG. 19A is a schematic section view of the hybrid camera showing a position of a light-receiving area in the CCD.
Figure 19B:
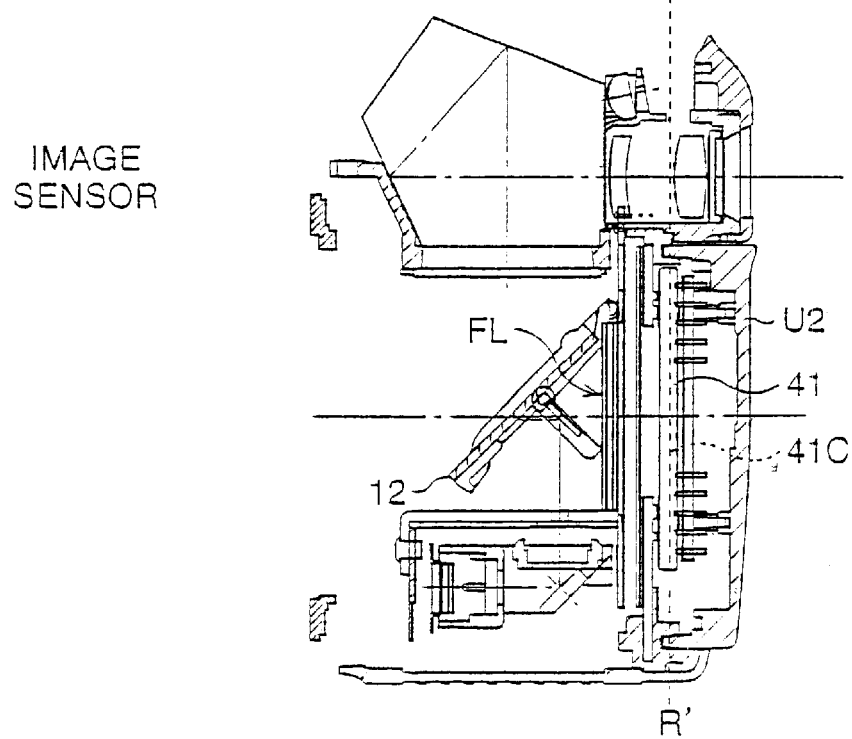
FIG. 19B is a schematic section view of the hybrid camera showing a position of the exposure area of the photographic film.

FIG. 19A is a section view of the hybrid camera showing the position of the exposure area FIG. 19B is a schematic section view of the hybrid camera showing the position of the photodetector 41C.

When the film back-cover U1 is attached to the body 10, the object image is focused at the position R of the focal plane. On the other hand, when the sensor back-cover U2 is attached to the body 10 and the filter FL is mounted in the body 10, the object image is focused at the shifted position R', shifted by the filter FL.

As describe above, in the third embodiment, the optical filter FL of the optical device is mounted in the body so as to shift the position R of the focal plane. Thus, the focused object image is obtained when using the CCD 41.

As the third film-positioning member 18" is fastened to the body 10, as applied in the conventional SLR type camera having the focal plane shutter, the conventional SLR type camera can be directly used, in the manufacture of the hybrid camera of the third embodiment.

In the third embodiment, the CCD 41 can be attached to the sensor back-cover such that the position of the surface of the CCD 41 coincides with the position R of the focal plane. Therefore, the filter FL does not have to greatly change the progress direction of light in the filter FL.

In a modification, other filters may be applied in place of the low-pass filter FL1 and the infrared-light absorption filter FL2. Further, other optical devices, such as a prism, may be applied in place of the optical filter. In this case, the optical device is parallelepiped and refracts light entering in the optical device to shift the position R of the focal plane to the shifted-position R'. Note that, the optical device is placed such that a front surface and a back surface of the optical device are respectively parallel to the focal plane.

FIGS. 20 to 27 show a fourth embodiment of a hybrid camera. The fourth embodiment is different from the first, second and third embodiments in that the position of the photographic film F is defined by a plate provided inside of a back-cover. Since other portions are similar to those of the first, second and third embodiments, designations remain the same and descriptions are omitted.

FIG. 20 is a section view showing an inner schematic arrangement of the hybrid camera with the film back-cover U1. As shown in FIG. 20, in the fourth embodiment, a film-positioning member having an aperture is not provided in the body 10.

A supporting-plate 19' is directly attached inside of the film back-cover U1 and has a pair of guide pieces 19'a to form the shift path of the photographic film F. The photographic film F is supported by the supporting-plate 19', as described above, whereby the position of the exposure area of the photographic film is defined at the position R of the focal plane.

Figure 21:
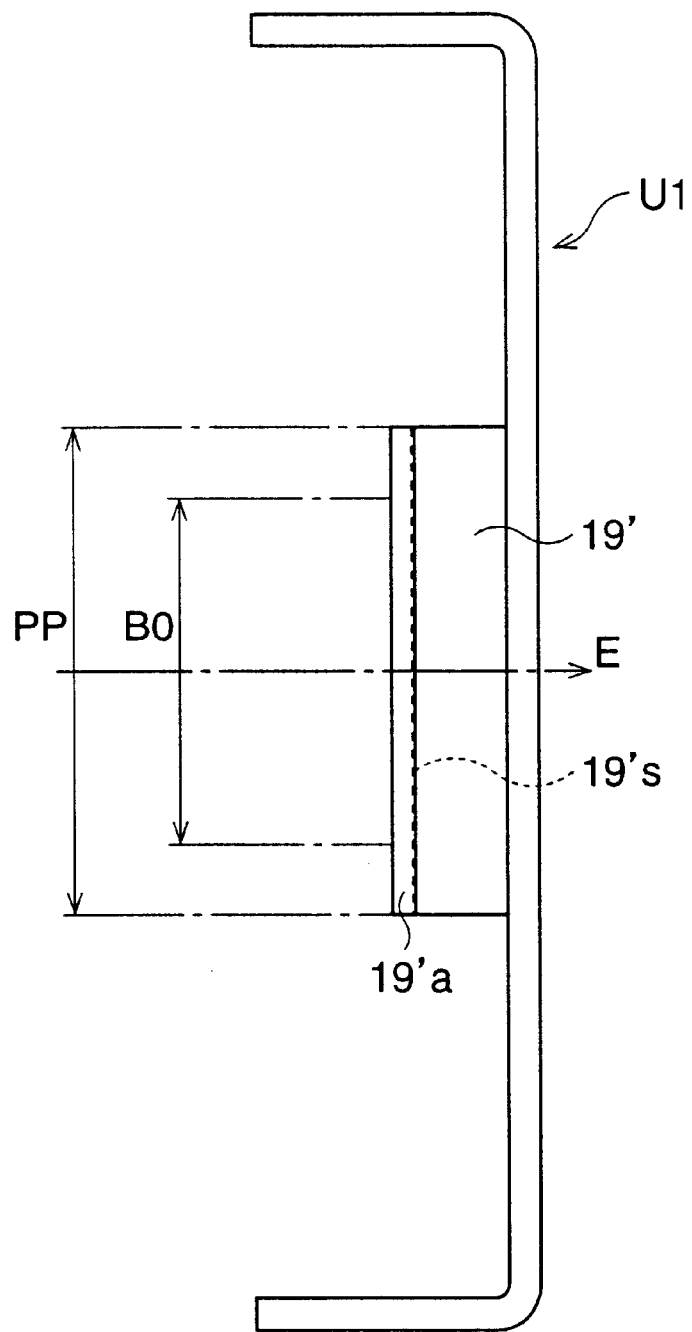
FIG. 21 is a plan view showing a supporting-plate.
Figure 22:
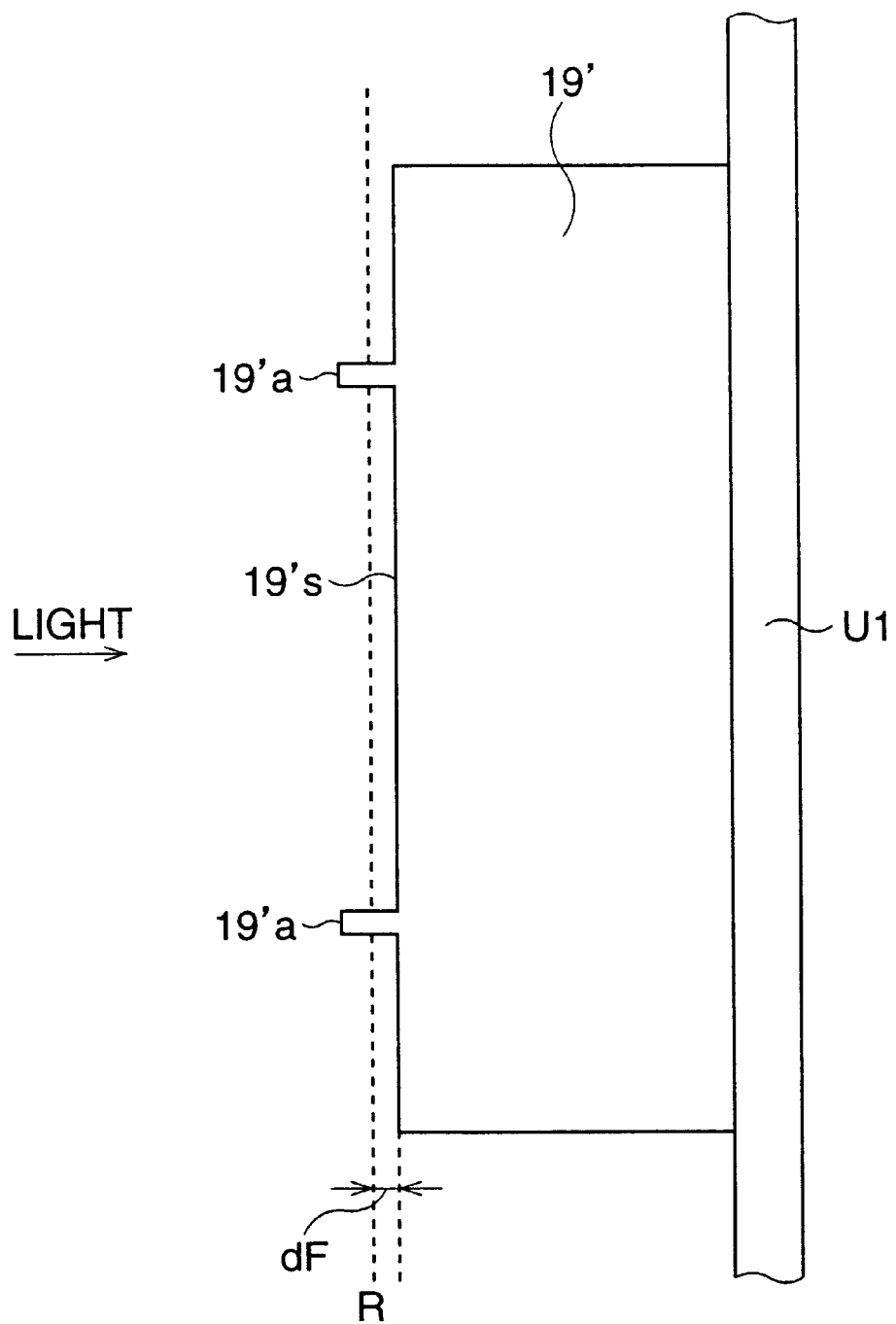
FIG. 22 is a side view showing the supporting-plate.

FIG. 21 is a plan view showing the film back-cover U1, and FIG. 22 is a side view of the supporting plate 19'. The supporting-plate 19', provided inside of the film back-cover U1, has a supporting-surface 19's, which is in parallel to the focal plane. The supporting-plate 19' is attached to the film back-cover U1 such that the position of the exposure area of the photographic film F coincides with the position R of the focal plane when the photographic film F is pressed toward the pressure-plate 19'.

The distance between the pair of guide pieces 19'a, provided on a surface 19's, corresponds to the width of the photographic film F. The photographic film F is moved along the shift path, defined by the pair of the guide pieces 19'a, while the photographic film F is wound. A position of the supporting-surface 19's along the optical axis E is backward of the focus position R by the thickness "dF" of the photographic film F as shown in FIG. 22. Note that, the thickness "dF" of the photographic film F is negligibly thin.

A length PP of the surface 19's is longer than the length of one frame (exposure area) of the photographic film F (shown by "B0"). However, as described in the second embodiment, light passing through the photographing optical system 11A substantially reaches only the exposure area of the photographic film F.

Figure 23:
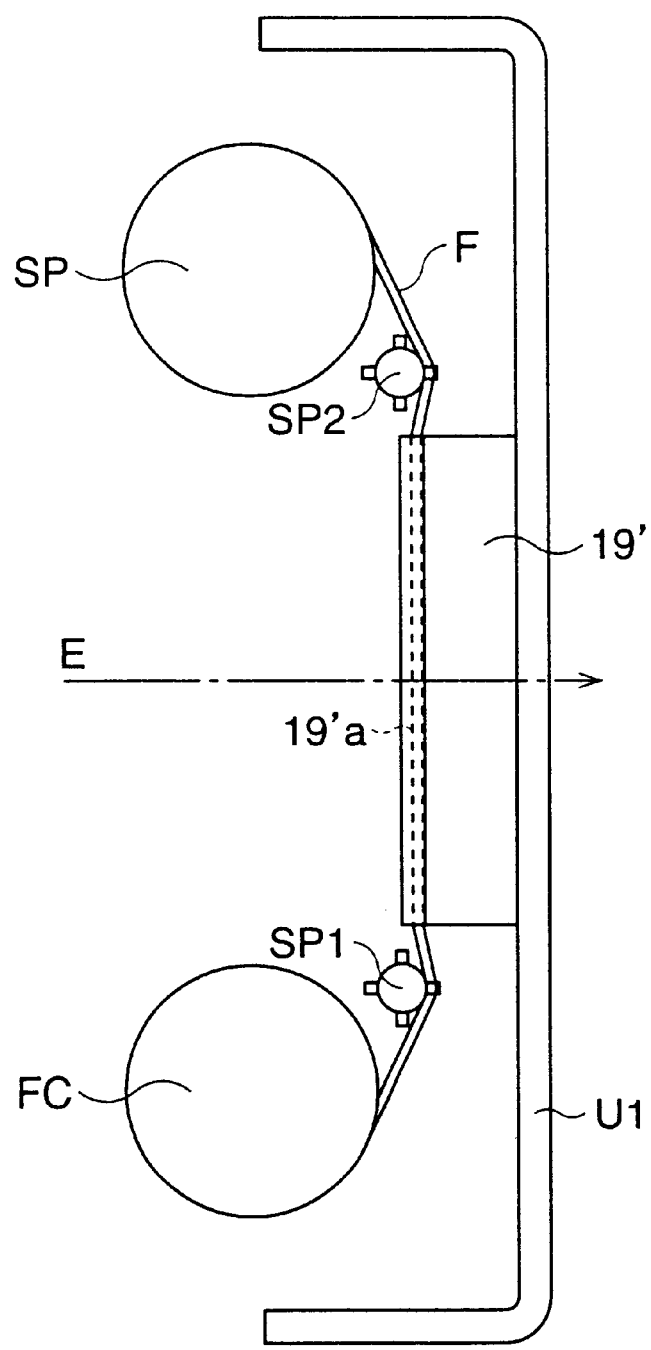
FIG. 23 is a plan view showing the supporting-plate with the photographic film.

FIG. 23 is a plan view showing the supporting-plate 19' when the photographic film F is provided in the body 10.

The film cartridge FC including the photographic film F is accommodated in the cartridge space formed in the body 10, as shown in the first, second and third embodiments. Two sprockets SP1, SP2 are provided on both sides of the supporting-plate 19', and then the spool SP and the cartridge space are provided on the outer side of the sprockets SP1, SP2, with respect to the optical axis E. The photographic film F, pulled out from the film cartridge, is engaged with the sprocket SP1 and the sprocket SP2 passing through the shift path formed by the guide pieces 19'a. Then, the photographic film F is wound by the spool SP provided in the body 10, and the sprockets SP1, SP2 are respectively rotated, engaging with the perforation P of the photographic film F. The positions of the sprocket SP1 and the sprocket SP2 are symmetrical with respect to the optical axis E.

Figure 24:
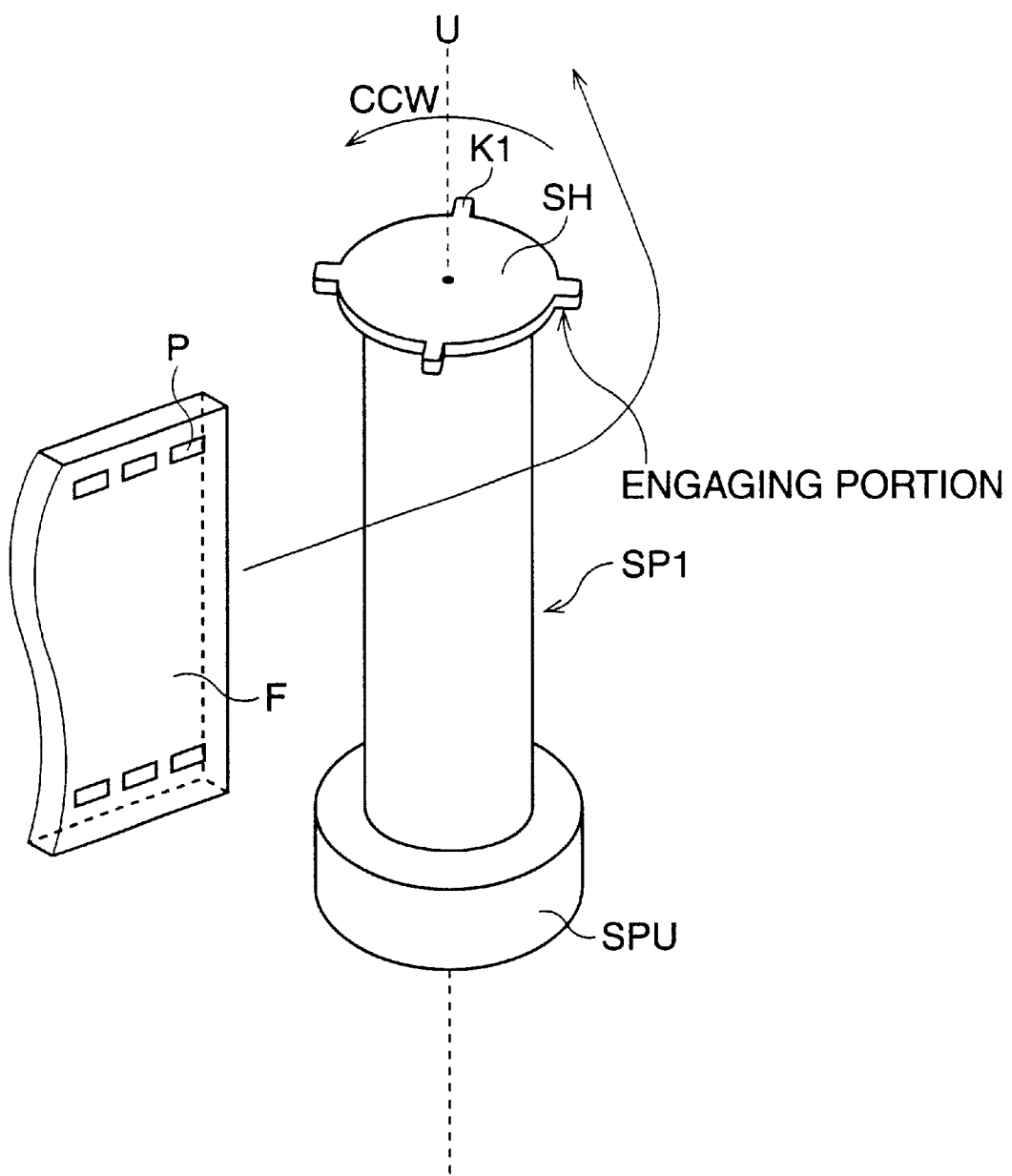
FIG. 24 is a perspective view showing a sprocket.

FIG. 24 is a perspective view showing the sprocket SP1.

An under portion SPU of the sprocket SP1 is connected to the body 10 via a connection member (not shown). A circle-shaped plate SH is provided on the top of the sprocket SP1, such that the circle-shaped plate SH is rotatable around a rotation axis U. Four protrusions K1 are formed on the circle-shaped plate SH at intervals of 90 degrees, such that the protrusions K1 engage with the perforation P of the photographic film F.

When the photographic film F is wound by the spool SP, the sprocket SP1 rotates counterclockwise according to the movement of the photographic film F. At this time, one of the four protrusions K1 is engaged with the perforation P in order, according to the rotation of the sprocket SP1.

Note that, the sprocket SP2 is identical to the sprocket SP1 in regard to form, and the sprocket SP2 is attached to the body 10 via a connection member (not shown), similarly to the sprocket SP1.

Figure 25:
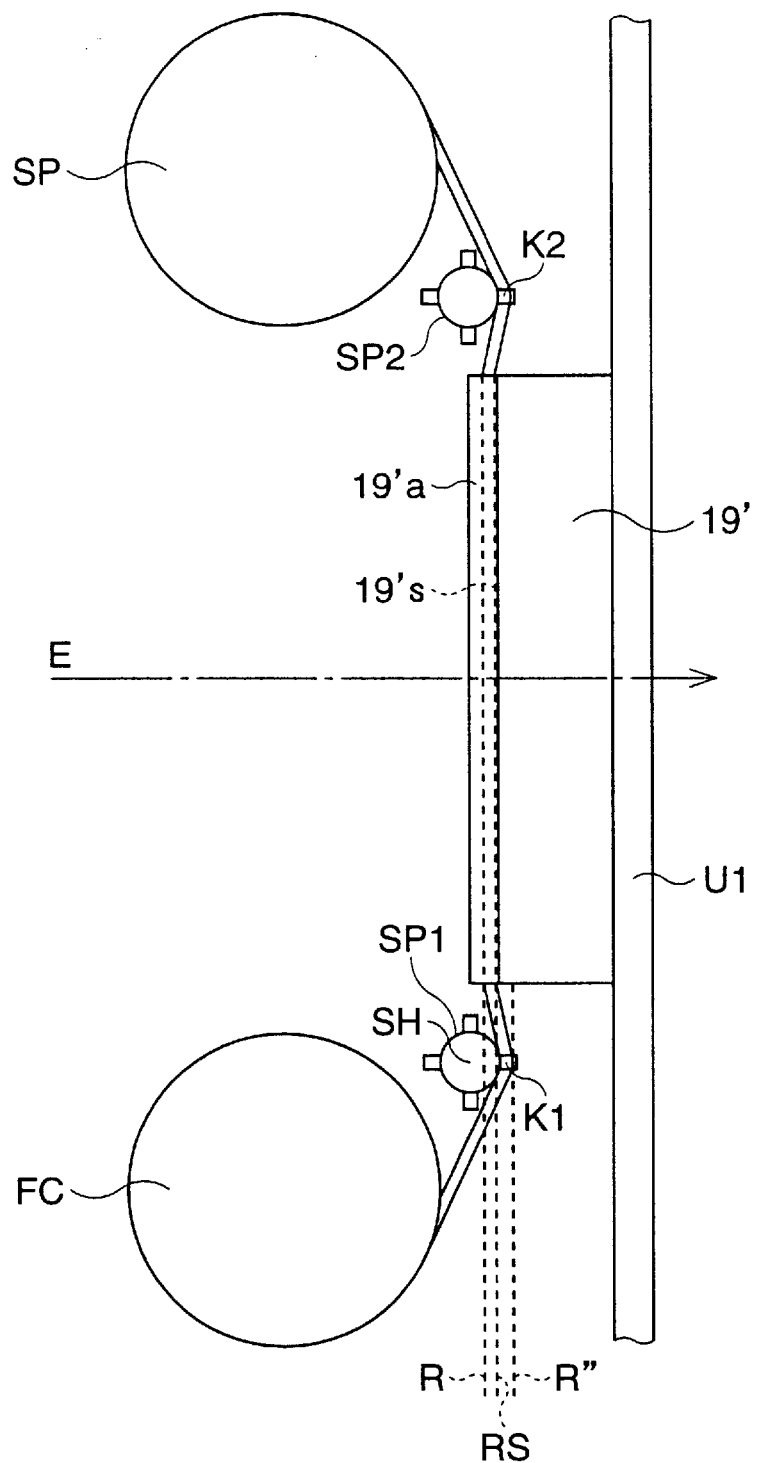
FIG. 25 is a view showing a position of the sprocket.

FIG. 25 is a plan view showing a position of the sprockets SP1, SP2.

As shown in FIG. 25, one of the protrusions K1 of the sprocket SP1 and one of protrusions K2, provided on the sprocket SP2, are engaged with the photographic film F. Then, the back surface of the photographic film F, opposite to the exposure area, is positioned at a position R", at the engaging-portion where the film F is engaged with one of the protrusions K1 and one of the protrusions K2. The position R" is backward of the position R of the focal plane, and is further backward of the position of the supporting-surface 19's, along the optical axis E (shown by "RS"). On the other hand, the positions of the spool SP and the cartridge space CS, namely, the film cartridge FC are forward of the positions of the sprockets SP1, SP2. Therefore, while the photographic film F is provided in the body 10, the photographic film F is securely pressed on the supporting-surface 19's. In this way, the placement of the sprockets SP1 and SP2, shown in FIG. 25, allows for the supporting-plate 19' to support the photographic film F such that the exposure area is placed at the position R of the focal plane.

Figure 26:
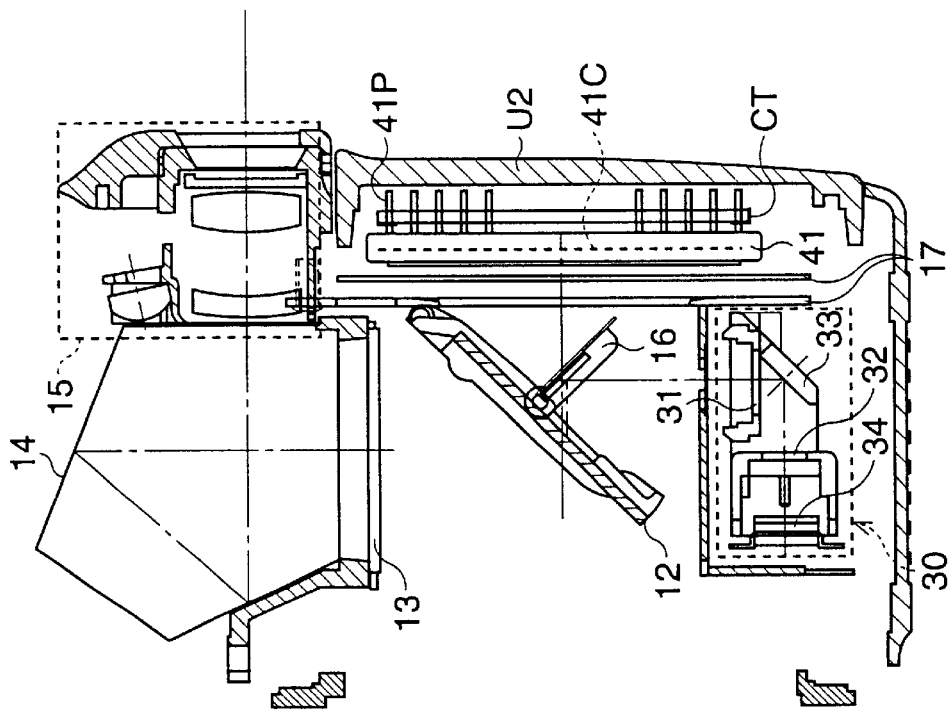
FIG. 26 is a section view showing an inner arrangement of the hybrid camera with a back-cover for the CCD.

FIG. 26 is a section view showing an inner schematic arrangement of the hybrid camera with the sensor back-cover U2.

In the fourth embodiment, as the supporting-plate 19' defines the position R of the exposure area of the photographic film F, the sensor accommodation space is formed at the rear of the shutter 17 in advance, different from the first and second embodiments. Then, the CCD 41 is attached inside of the sensor back-cover U2, such that the position of the photodetector 41C coincides with the position R, along the optical axis E.

FIG. 27A is a section view showing the position of the exposure area FIG. 19B is a schematic section view of the hybrid camera showing of the photographic film F the position of the photodetector 41C.

As shown in FIG. 27, when the film back-sensor U1 is attached to the body 10, the photographic film F is positioned at the position R of the focal plane. On the other hand, when the sensor back-cover U2 is attached to the body 10, the position of the photodetector 41C also coincides with the position R of the focal plane.

As described above, in the fourth embodiment, the supporting-plate 19', provided inside of the film back-cover U1, defines the position of the exposure area of the photographic film in place of a film-positioning member, and then the sensor accommodation space is formed at the rear of the shutter 17. Thus, the focused object image is obtainable when using both the photographic film and the CCD 41.

Note that, the hybrid camera may be an other type of camera, such as a lens-united SLR camera having a lens shutter, which is so called a lens shutter camera, and so on.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Applications No. 11-114800 (filed on Apr. 22, 1999), No. 11-114857 (filed on Apr. 22, 1999), No. 11-117811 (filed on Apr. 26, 1999) and No. 11-117818 (filed on Apr. 26, 1999), which are expressly incorporated herein, by reference, in their entirety.

What is claimed is:

1. A hybrid camera selectively using one of a photographic film and an image sensor, to record an object image, said hybrid camera comprising:
   a photographing optical system that forms the object image;
   a body, to which said photographing optical system is connected; and
   a film positioner detachably mounted in said body, that defines a position of an exposure area of said photographic film, along an optical axis of said photographing optical system, said film positioner having a frame forming an aperture for admitting light directed by said photographing optical system, a pair of support members each having a support surface, and a pair of guide members, the position of the exposure area being defined by said pair of support members, a shift path of said photographic film being formed by said pair of guide members;
   an accommodation space, which can accommodate said image sensor that is larger than said aperture, being formed in said body by detaching said film positioner;
   wherein said film positioner is mounted in front of a focal plane, defined by said photographing optical system, along the optical axis in said body such that the position of said exposure area coincides with a position of the focal plane, when said photographic film is used;
   wherein said image sensor is rigidly attached to a second back-cover detachably attached to the rear of said body, and
   wherein said image sensor is placed in said accommodation space by detaching said film positioner and attaching said second back-cover, such that a position of a light-receiving area of said image sensor coincides with the position of the focal plane which is the same as the position of the exposure area, along the optical axis, when said image sensor is used.

2. The hybrid camera of claim 1, wherein
   said frame forms said aperture, substantially corresponding to said exposure area, that admits light directed by said photographing optical system;
   said pair of support members are provided on said frame, opposite to said photographing optical system, such that said aperture is between said pair of support members, and said support surface is parallel to the focal plane and supports said photographic film to define the position of said exposure area; and
   said photographic film is placed on said support surface such that light admitted through said aperture reaches said exposure area.

3. The hybrid camera of claim 2, further comprising a pressure plate that presses said photographic film to said support surface;
   wherein said photographic film is slidably interposed between said support surface and said pressure plate, such that the position of said exposure area coincides with the position of the focal plane.

4. The hybrid camera of claim 3, wherein said body includes a first back-cover for said photographic film, that is detachably and releasably mounted at the rear side of said body so as to accommodate said photographic film, said pressure plate being attached inside of said first back-cover such that the position of said exposure area coincides with the position of the focal plane when said first back-cover is closed.

5. The hybrid camera of claim 3, wherein said pair of guide members are provided on said frame, on the same side as said support members, such that said aperture is between said pair of guide members, and said guide members form the shift path of said photographic film depending upon a width of said photographic film, and said photographic film is moved along the shift path.

6. The hybrid camera of claim 5, wherein said body includes:
   a spool that winds said photographic film; and a cartridge housing that forms a cartridge space for accommodating a film cartridge, in which said photographic film is rolled;

wherein said spool and said cartridge space are provided on opposite sides of said film positioner along the shift path, and said photographic film, pulled out from said film cartridge, is fed to said spool by passing along the shift path when said photographic film is wound by said spool.

7. The hybrid camera of claim 1, wherein said film positioner includes an attachment-opening for inserting a screw and said body includes a screw-opening corresponding to the screw, said film positioner being mounted in said body by inserting the screw into said screw-opening via said attachment-opening.

8. The hybrid camera of claim 4, wherein said body includes said second back-cover for said image sensor, that includes said image sensor and is detachably and releasably mounted at the rear side of said body, said image sensor being attached inside of said second back-cover, such that the position of said light-receiving area coincides with the position of the focal plane, along the optical axis, when said second back-cover is closed.

9. The hybrid camera of claim 1, wherein a size of said light-receiving area substantially coincides with the area of said aperture, and a size of said image sensor is larger than the area of said aperture.

10. The hybrid camera of claim 1, wherein said image sensor has a transparent cover glass that covers said image sensor, such that a surface of said image sensor is formed by said cover glass, said light-receiving area being disposed under said cover glass.

11. The hybrid camera of claim 1, wherein said hybrid camera is a single lens reflex type of camera having a focal plane shutter, said photographing optical system being interchangeable.

12. A film positioner of a hybrid camera including a photographing optical system and a body, to which said photographing optical system is connected, selectively using one of a photographic film and an image sensor to record an object image, said film positioner comprising:

a frame that forms an aperture, substantially corresponding to an exposure area of said photographic film, that admits light, directed by said photographing optical system;

a pair of support members provided on said frame such that said aperture is between said pair of support members, that includes a support surface that supports said photographic film to define a position of an exposure area of said photographic film, along an optical axis of said photographing optical system, said film positioner being detachably mounted in said body; and a pair of guide members provided on said fram that form a shift path of the photographic film;

wherein said film positioner is mounted in front of a focal plane, defined by said photographing optical system, along the optical axis in said body, such that the position of said exposure area of said photographic film placed on said support surface coincides with a position of the focal plane, defined by said photographing optical system, when said photographic film is used; and wherein said image sensor is rigidly attached to a second back-cover detachably attached to the rear of said body, and wherein said image sensor is placed in a accommodation space, formed in said body by detaching said film positioner, such that a position of a light-receiving area of said image sensor coincides with the position of the focal plane which is the same as the position of the exposure area, along the optical axis, when said image sensor is used.

13. A hybrid camera selectively using one of a photographic film and an image sensor, to record an object image, said hybrid camera comprising:

a photographic optical system that forms the object image;

a body, to which said photographing optical system is connected; and a film positioner provided in said body, that defines a position of an exposure area of said photographic film, along an optical axis of said photographing optical system, such that the position of said exposure area coincides with a position of a focal plane, defined by said photographing optical system;

wherein said film positioner has an aperture that admits light, directed by said photographing optical system, such that the object image is formed on said exposure area, and said film positioner is formed such that said aperture is enlargable, an accommodation space, which can accommodate said image sensor, being formed by enlarging said aperture;

wherein said aperture generally corresponds to said exposure area when using said photographic film, and then said aperture is enlarged and said image sensor is placed in said accommodation space, such that a position of a light-receiving area of said image sensor coincides with the position of the focal plane, along the optical axis, when said image sensor is used; and wherein said film positioner consists of two U-shaped plates, and said aperture is formed in such a manner that said two U-shaped plates face each other, said two U-shaped plates being respectively movable in parallel to the focal plane, such that said aperture is enlarged by separating said two U-shaped plates while maintaining a facing condition of said two U-shaped plates.

14. The hybrid camera of claim 13, wherein said body includes a lever pivotably connected to each of said U-shaped plates, that shifts said two U-shaped plates such that each of said two U-shaped plates is shifted by a same shifting-amount.

15. The hybrid camera of claim 13, wherein said two U-shaped plates have respectively a support member provided on a frame forming said aperture, opposite to said photographing optical system, having a support surface parallel to the focal plane that supports said photographic film to define the position of said exposure area, said photographic film being placed on said support surface such that light admitted through said aperture reaches said exposure area.

16. The hybrid camera of claim 15, further comprising a pressure plate that presses said photographic film to said support surface;

wherein said photographic film is slidably interposed between said support surface and said pressure plate, such that the position of the exposure area coincides with the position of the focal plane.

17. The hybrid camera of claim 16, wherein said body includes a first back-cover for said photographic film, that is detachably and releasably mounted at the rear side of said body so as to accommodate said photographic film, said pressure plate being attached inside of said first back-cover such that the position of said exposure area coincides with the position of the focal plane when said first back-cover is closed.

18. The hybrid camera of claim 16, wherein said U-shaped plates have respectively a guide member provided on said frame, on the same side as said support surface, that forms a shift path of said photographic film depending upon a width of said a photographic film, said photographic film being moved along the shift path.

19. The hybrid camera of claim 18, wherein said two U-shaped plates are moved along a direction, vertically and at a right angle to the shift path.

20. The hybrid camera of claim 18, wherein said body includes:
  a spool that winds said photographic film; and
  a cartridge housing that forms a cartridge space for accommodating a film cartridge, in which said photographic film is rolled;
    wherein said spool and said cartridge space are provided on opposite sides of said second film positioner along the shift path, and said photographic film, pulled out from said film cartridge, is fed to said spool by passing along the shift path when said photographic film is wound by said spool.

21. The hybrid camera of claim 17, wherein said body includes a second back-cover for said image sensor, that includes said image sensor and is detachably and releasably mounted at the rear of said body, said image sensor is attached inside of said second back-cover, such that the position of the light-receiving area of the image sensor coincides with the position of the focal plane when said second back-cover is attached to said body and closed.

22. The hybrid camera of claim 13, wherein a size of said light-receiving area substantially coincides with the area of said aperture, and a size of said image sensor is larger than the area of said aperture.

23. The hybrid camera of claim 13, wherein said image sensor has a transparent cover glass that covers said image sensor, such that a surface of said image sensor is formed by said cover glass, said light-receiving area being disposed inside said image sensor.

24. The hybrid camera of claim 13, wherein said hybrid camera is a single lens reflex type of camera having a focal plane shutter, said photographing optical system being interchangeable.

25. A hybrid camera selectively using one of a photographic film and an image sensor, to record an object image, said hybrid camera comprising:
  a photographing optical system that forms the object image;
  a body, to which said photographing optical system is connected;
  a first back-cover for said photographic film that is detachably and releasably mounted at the rear side of said body; and
  a second back-cover for said image sensor that is detachably mounted at the rear side of said body, said image sensor being rigidly attached to said second back-cover;
    wherein said first back-cover has a film positioner provided inside of said first back-cover, that defines a position of an exposure area of said photographic film, along an optical axis of said photographing optical system, such that the position of said exposure area coincides with a position of a focal plane, defined by said photographing optical system, said film positioner having a frame forming an aperture for admitting light directed by said photographing optical system, a pair of support members each having a support surface, and a pair of guide members, the position of the exposure area being defined by said pair of support members, a shift path of said photographic film being formed by said pair of guide members;
    an accommodation space, which can accommodate said image sensor that is larger than said aperture, being formed at the rear of said photographing optical system; and
    wherein said first back-cover is attached to said body when said photographic film is used, and said second back-cover is attached to said body and said image sensor is placed in said accommodation space such that the position of light-receiving area of said image sensor coincides with the position of the focal plane which is the same as the position of the exposure area, along the optical axis, when said image sensor is used.

26. The hybrid camera of claim 25, wherein
  each said supporting surface is parallel to the focal plane and supports said photographic film, opposite to said exposure area, to define the position of said exposure area; and
  said pair of guide members are provided on said supporting surface and form the shift path of said photographic film depending upon a width of said photographic film.

27. The hybrid camera of claim 26, wherein said body includes:
  a spool that winds said photographic film;
  a cartridge housing that forms a cartridge space for accommodating a film cartridge, in which said photographic film is rolled; and
  two sprockets that feed said photographic film from said cartridge space to said spool;
    wherein one of said two sprockets is provided on opposite sides of said film positioner along the shift path, and said spool and said cartridge housing are provided on the outer sides of said two sprockets along the shift path, said photographic film, pulled out from said film cartridge, being fed to said spool by passing along the shift path, when said photographic film is wound by said spool.

28. The hybrid camera of claim 27, wherein an engaging-position between said photographic film and said two sprockets along the optical axis is backward of the position of said exposure area of said photographic film.

29. The hybrid camera of claim 25, wherein said image sensor is attached inside of said second back-cover, such that the position of the light-receiving area of said image sensor coincides with the position of the focal plane, when said second back-cover is attached to said body and closed.

30. The hybrid camera of claim 25, wherein a size of said light-receiving area substantially coincides with the area of said aperture, and a size of said image sensor is larger than the area of said aperture.

31. The hybrid camera of claim 25, wherein said image sensor has a transparent cover glass that covers said image sensor, such that a surface of said image sensor is formed by said cover glass, said light-receiving area being disposed under said cover glass.

32. The hybrid camera of claim 25, wherein said hybrid camera is a single lens reflex type of camera having a focal plane shutter, said photographing optical system being interchangeable.

* * * * *